US011362840B2

(12) United States Patent
Sun et al.

(10) Patent No.: US 11,362,840 B2
(45) Date of Patent: Jun. 14, 2022

(54) METHODS, APPARATUSES, DEVICES AND SYSTEMS FOR BACKTRACKING SERVICE BEHAVIOR

(71) Applicant: ALIPAY (HANGZHOU) INFORMATION TECHNOLOGY CO., LTD., Zhejiang (CN)

(72) Inventors: Shanlu Sun, Hangzhou (CN); Ping Dai, Hangzhou (CN); Xiuying Dai, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/348,595

(22) Filed: Jun. 15, 2021

(65) Prior Publication Data

US 2022/0014384 A1 Jan. 13, 2022

(30) Foreign Application Priority Data

Jul. 10, 2020 (CN) .......................... 202010665055.X

(51) Int. Cl.
*H04L 9/32* (2006.01)
*H04L 9/08* (2006.01)

(52) U.S. Cl.
CPC ............ *H04L 9/3247* (2013.01); *H04L 9/085* (2013.01); *H04L 9/0825* (2013.01);
(Continued)

(58) Field of Classification Search
CPC ... H04L 9/3247; H04L 9/0825; H04L 9/0844; H04L 9/085; H04L 9/3236; H04L 2209/38
(Continued)

(56) References Cited

U.S. PATENT DOCUMENTS 10,482,441 B1* 11/2019 Watson ................ G06Q 20/42
11,012,232 B2* 5/2021 Kurian ................. G06Q 40/06
(Continued)

FOREIGN PATENT DOCUMENTS

CN 107968709 4/2018
CN 109872196 6/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kambiz Zand
*Assistant Examiner* — Mahabub S Ahmed
(74) *Attorney, Agent, or Firm* — Fish & Richardson P.C.

(57) ABSTRACT

Disclosed herein are methods, systems, and media for backtracking a user's operation of services. One method comprises: receiving an authorization request from a service device, the authorization request based on a service processing request from a client device, and comprises: data corresponding to a user's operation related to a service, authorization information for accessing the data granted to the service device; a first digital identity of the user; and a second digital identity of the service device; in response to determining that the authorization information satisfies a condition, generating a claim based on the data, the authorization information, the first digital identity, and the second digital identity; recording the claim to a blockchain; and in response to determining that a supervising user has permission to access the claim, granting permission to the supervising user to backtrack the user's operation corresponding to the service based on the claim in the blockchain.

18 Claims, 13 Drawing Sheets

(52) U.S. Cl.
CPC .......... *H04L 9/0844* (2013.01); *H04L 9/3236* (2013.01); *H04L 2209/38* (2013.01)

(58) Field of Classification Search
USPC .......................................................... 713/176
See application file for complete search history.

(56) References Cited

U.S. PATENT DOCUMENTS

| | | | | |
|---|---|---|---|---|
| 11,115,186 | B2* | 9/2021 | Kurian | G06Q 20/3672 |
| 11,138,572 | B2* | 10/2021 | Groarke | H04L 9/3247 |
| 2006/0206506 | A1* | 9/2006 | Fitzpatrick | G06Q 20/20 |
| 2017/0236103 | A1* | 8/2017 | Biton | G06Q 20/0655 |
| | | | | 705/64 |
| 2017/0316390 | A1* | 11/2017 | Smith | H04L 9/3239 |
| 2017/0330180 | A1* | 11/2017 | Song | G06Q 20/102 |
| 2017/0338967 | A1* | 11/2017 | Lewison | H04L 9/3268 |
| 2018/0225469 | A1* | 8/2018 | Daniel | H04L 63/10 |
| 2019/0018887 | A1* | 1/2019 | Madisetti | G06Q 20/0658 |
| 2019/0020629 | A1* | 1/2019 | Baird, III | H04L 63/0442 |
| 2019/0028277 | A1* | 1/2019 | Jayachandran | H04L 9/3239 |
| 2019/0036700 | A1* | 1/2019 | Sundaresan | H04L 9/3226 |
| 2019/0036710 | A1* | 1/2019 | Qiu | H04L 9/006 |
| 2019/0036712 | A1* | 1/2019 | Qiu | H04L 63/12 |
| 2019/0156336 | A1* | 5/2019 | Kasthuri | H04L 63/0428 |
| 2019/0190724 | A1* | 6/2019 | Sundaresan | H04L 9/3271 |
| 2019/0205873 | A1* | 7/2019 | Kamalsky | G06Q 40/08 |
| 2019/0303935 | A1* | 10/2019 | Cantrell | G06Q 20/208 |
| 2019/0334700 | A1* | 10/2019 | Callan | G06F 16/27 |
| 2019/0370810 | A1* | 12/2019 | Hu | H04L 9/0637 |
| 2019/0370811 | A1* | 12/2019 | Zhang | H04L 9/0637 |
| 2020/0082405 | A1* | 3/2020 | Li | H04L 9/3247 |
| 2020/0097927 | A1* | 3/2020 | Groarke | H04L 9/3239 |
| 2020/0143469 | A1* | 5/2020 | Stewart | G06Q 20/367 |
| 2020/0145223 | A1* | 5/2020 | Yang | H04L 9/0643 |
| 2020/0160340 | A1* | 5/2020 | Walters | G06Q 20/3829 |
| 2020/0202016 | A1* | 6/2020 | Yan | H04L 9/3236 |
| 2020/0213104 | A1* | 7/2020 | Kurian | H04L 9/3247 |
| 2020/0213329 | A1* | 7/2020 | Simons | G06F 21/62 |
| 2020/0242593 | A1* | 7/2020 | Deshpande | H04L 9/0637 |
| 2020/0294124 | A1* | 9/2020 | Jia | H04L 63/12 |
| 2020/0374135 | A1* | 11/2020 | Lu | G06Q 10/10 |
| 2021/0097532 | A1* | 4/2021 | Mahasuverachai | H04L 9/0643 |
| 2021/0099285 | A1* | 4/2021 | Li | H04L 63/123 |
| 2021/0152536 | A1* | 5/2021 | Padmanabhan | H04L 63/0428 |
| 2021/0160067 | A1* | 5/2021 | Liu | H04L 9/3239 |
| 2021/0160340 | A1* | 5/2021 | Narayanan | H04W 12/106 |
| 2021/0166231 | A1* | 6/2021 | Han | G06Q 20/3829 |
| 2021/0167972 | A1* | 6/2021 | Zang | H04L 63/0823 |
| 2021/0174634 | A1* | 6/2021 | Purohit | G07F 17/3227 |
| 2021/0176075 | A1* | 6/2021 | Chu | H04L 9/3247 |
| 2021/0203510 | A1* | 7/2021 | Sankey | G06Q 30/0185 |
| 2021/0243022 | A1* | 8/2021 | Joseph | H04L 9/0643 |
| 2021/0258161 | A1* | 8/2021 | Bonnell | G06F 21/6245 |
| 2021/0314174 | A1* | 10/2021 | Sundaresan | H04L 9/3226 |
| 2021/0390191 | A1* | 12/2021 | Doney | G06Q 20/3674 |

FOREIGN PATENT DOCUMENTS

| | | |
|---|---|---|
| CN | 110096901 | 8/2019 |
| CN | 110233739 | 9/2019 |
| CN | 111241157 | 6/2020 |

OTHER PUBLICATIONS

Nakamoto, "Bitcoin: A Peer-to-Peer Electronic Cash System," www.bitcoin.org, 2005, 9 pages.
Extended European Search Report in European Application No. 21182294.5, dated Dec. 10, 2021, 12 pages.
Liu et al., "An Identity Management System Based on Blockchain," 2017 15th Annual Conference on Privacy, Security and Trust (PST), Aug. 28, 2017, pp. 44-53.

* cited by examiner

METHODS, APPARATUSES, DEVICES AND SYSTEMS FOR BACKTRACKING SERVICE BEHAVIOR

CROSS-REFERENCE TO RELATED APPLICATIONS

This application claims priority to Chinese Patent Application No. 202010665055.X, filed on Jul. 10, 2020, which is hereby incorporated by reference in its entirety.

TECHNICAL FIELD

The present specification relates to the field of data processing technologies, in particular, to methods, apparatuses, devices and systems for backtracking a service behavior.

BACKGROUND

Service processing is not new to people, such as processing insurance services and bank account registration services. Generally, in the process of service processing, users need to provide personal information and perform operations related to service processing, such as clicking OK buttons and signing. In recent years, after service processing is completed, users sometimes cannot enjoy corresponding services due to personal information errors, or users do not admit that they have accepted relevant services because the services have not reached the users' expected effects, and other similar events happen occasionally. Since it is difficult to provide evidence to restore the service processing process, previously mentioned situations may cause losses to users and troubles to service providers from time to time.

SUMMARY

One or more embodiments of the present specification provide a method for backtracking a service behavior, applied to an identity management system. The method includes receiving an authorization request sent by a service device. The authorization request is sent based on a service processing request sent by a client device. The authorization request includes behavior data of an operational behavior of a first user in the client device corresponding to a service to be processed, authorization information on an operation permission for the behavior data granted by the first user to the service device, first digital identity information of the first user, and second digital identity information of the service device. A first verifiable claim is generated based on the behavior data, the authorization information, the first digital identity information, and the second digital identity information if it is determined that the authorization information satisfies a predetermined authorization condition. The first verifiable claim represents that the service device is granted the operation permission. The first verifiable claim is saved to a blockchain. As such, a supervision organization, when granted an access permission of the first verifiable claim, backtracks the operational behavior of the first user corresponding to the service to be processed based on the first verifiable claim in the blockchain.

One or more embodiments of the present specification provide a method for backtracking a service behavior, applied to a service device. The method includes receiving a service processing request sent by a client device. The service processing request includes behavior data of an operational behavior of a first user in the client device corresponding to a service to be processed. Corresponding service processing is performed based on the service processing request, and authorization information on an operation permission for the behavior data granted by the first user to the service device is obtained. An authorization request is sent to an identity management system based on the authorization information, the behavior data, obtained first digital identity information of the first user, and second digital identity information of the service device. As such, the identity management system saves a first verifiable claim generated based on the behavior data, the authorization information, the first digital identity information, and the second digital identity information to a blockchain. A supervision organization, when granted an access permission of the first verifiable claim, backtracks the operational behavior of the first user corresponding to the service to be processed based on the first verifiable claim in the blockchain. The first verifiable claim is used to prove that the service device is granted the operation permission.

One or more embodiments of the present specification provide a system for backtracking a service behavior. The system includes an application layer subsystem, a backtracking layer subsystem, and a storage layer subsystem. The application layer subsystem is configured to obtain behavior data of an operational behavior of a first user in the application layer subsystem corresponding to a service to be processed, and send a service processing request to the backtracking layer subsystem based on the behavior data. The backtracking layer subsystem is configured to perform corresponding service processing based on the service processing request, obtain authorization information on an operation permission for the behavior data granted by the first user to the backtracking layer subsystem, if it is determined that the authorization information satisfies a predetermined authorization condition, generate a first verifiable claim based on the behavior data, the authorization information, first digital identity information of the first user, and second digital identity information of the backtracking layer subsystem, and send the first verifiable claim to the storage layer subsystem. The first verifiable claim represents that the service device is granted the operation permission. The storage layer subsystem is configured to store the first verifiable claim. As such, a supervision organization, when granted an access permission of the first verifiable claim, backtracks the operational behavior of the first user corresponding to the service to be processed based on the first verifiable claim in the storage layer subsystem.

One or more embodiments of the present specification provide an apparatus for backtracking a service behavior, applied to an identity management system. The apparatus includes a receiving module, configured to receive an authorization request sent by a service device. The authorization request is sent based on a service processing request sent by a client device. The authorization request includes behavior data of an operational behavior of a first user in the client device corresponding to a service to be processed, authorization information on an operation permission for the behavior data granted by the first user to the service device, first digital identity information of the first user, and second digital identity information of the service device. The apparatus further includes a generation module, configured to generate a first verifiable claim based on the behavior data, the authorization information, the first digital identity information, and the second digital identity information, if it is determined that the authorization information satisfies a predetermined authorization condition. The first verifiable claim represents that the service device is granted the operation permission. The apparatus further includes a saving module, configured to save the first verifiable claim to a blockchain. As such, a supervision organization, when granted an access permission of the first verifiable claim, backtracks the operational behavior of the first user corresponding to the service to be processed based on the first verifiable claim in the blockchain.

One or more embodiments of the present specification provide an apparatus for backtracking a service behavior, applied to a service device. The apparatus includes a receiving module, configured to receive a service processing request sent by a client device. The service processing request includes behavior data of an operational behavior of a first user in the client device corresponding to a service to be processed. The apparatus further includes a processing module configured to perform corresponding service processing based on the service processing request, and obtain authorization information on an operation permission for the behavior data granted by the first user to the service device. The apparatus further includes a sending module, configured to send an authorization request to an identity management system based on the authorization information, the behavior data, obtained first digital identity information of the first user, and second digital identity information of the service device. As such, the identity management system saves a first verifiable claim generated based on the behavior data, the authorization information, the first digital identity information, and the second digital identity information to a blockchain. A supervision organization, when granted an access permission of the first verifiable claim, backtracks the operational behavior of the first user corresponding to the service to be processed based on the first verifiable claim in the blockchain. The first verifiable claim is used to prove that the service device is granted the operation permission.

One or more embodiments of the present specification provide a system for backtracking a service behavior. The system includes a client device, a service device, an identity management system, a supervision organization, and a blockchain. The client device is configured to obtain behavior data of an operational behavior of a first user in the client device corresponding to a service to be processed, and send a service processing request to the service device based on the behavior data. The service device is configured to receive the service processing request sent by the client device, perform corresponding service processing based on the service processing request, obtain authorization information on an operation permission for the behavior data granted by the first user to the service device, and send an authorization request to the identity management system based on the authorization information, the behavior data, obtained first digital identity information of the first user, and second digital identity information of the service device. The identity management system is configured to receive the authorization request sent by the service device, generate a first verifiable claim based on the behavior data, the authorization information, the first digital identity information, and the second digital identity information if it is determined that the authorization information satisfies a predetermined authorization condition, and save the first verifiable claim to the blockchain, where the first verifiable claim represents that the service device is granted the operation permission. The supervision organization is configured to, if determined to be granted an access permission of the first verifiable claim, backtrack the operational behavior of the first user corresponding to the service to be processed based on the first verifiable claim in the blockchain. The blockchain is configured to save the first verifiable claim.

One or more embodiments of the present specification provide a device for backtracking a service behavior. The device includes a processor. The device further includes a memory arranged to store computer-executable instructions. When the computer-executable instructions are executed, the processor receives an authorization request sent by a service device. The authorization request is sent based on a service processing request sent by a client device. The authorization request includes behavior data of an operational behavior of a first user in the client device corresponding to a service to be processed, authorization information on an operation permission for the behavior data granted by the first user to the service device, first digital identity information of the first user, and second digital identity information of the service device. A first verifiable claim is generated based on the behavior data, the authorization information, the first digital identity information, and the second digital identity information if it is determined that the authorization information satisfies a predetermined authorization condition. The first verifiable claim represents that the service device is granted the operation permission. The first verifiable claim is saved to a blockchain. As such, a supervision organization, when granted an access permission of the first verifiable claim, backtracks the operational behavior of the first user corresponding to the service to be processed based on the first verifiable claim in the blockchain.

One or more embodiments of the present specification provide a device for backtracking a service behavior. The device includes a processor. The device further includes a memory arranged to store computer-executable instructions. When the computer-executable instructions are executed, the processor receives a service processing request sent by a client device. The service processing request includes behavior data of an operational behavior of a first user in the client device corresponding to a service to be processed. Corresponding service processing is performed based on the service processing request, and authorization information on an operation permission for the behavior data granted by the first user to the service device is obtained. An authorization request is sent to an identity management system based on the authorization information, the behavior data, obtained first digital identity information of the first user, and second digital identity information of the service device. As such, the identity management system saves a first verifiable claim generated based on the behavior data, the authorization information, the first digital identity information, and the second digital identity information to a blockchain. A supervision organization, when granted an access permission of the first verifiable claim, backtracks the operational behavior of the first user corresponding to the service to be processed based on the first verifiable claim in the blockchain. The first verifiable claim is used to prove that the service device is granted the operation permission.

One or more embodiments of the present specification provide a storage medium, configured to store computer-executable instructions. When the computer-executable instructions are executed, an authorization request sent by a service device is received. The authorization request is sent based on a service processing request sent by a client device. The authorization request includes behavior data of an operational behavior of a first user in the client device corresponding to a service to be processed, authorization information on an operation permission for the behavior data granted by the first user to the service device, first digital identity information of the first user, and second digital identity information of the service device. A first verifiable claim is generated based on the behavior data, the authorization information, the first digital identity information, and the second digital identity information, if it is determined that the authorization information satisfies a predetermined authorization condition. The first verifiable claim represents that the service device is granted the operation permission. The first verifiable claim is saved to a blockchain. As such, a supervision organization, when granted an access permission of the first verifiable claim, backtracks the operational behavior of the first user corresponding to the service to be processed based on the first verifiable claim in the blockchain.

One or more embodiments of the present specification provide a storage medium, configured to store computer-executable instructions. A service processing request sent by a client device is received when the computer-executable instructions are executed. The service processing request includes behavior data of an operational behavior of a first user in the client device corresponding to a service to be processed. Corresponding service processing is performed based on the service processing request, and authorization information on an operation permission for the behavior data granted by the first user to the service device is obtained. An authorization request is sent to an identity management system based on the authorization information, the behavior data, obtained first digital identity information of the first user, and second digital identity information of the service device. As such, the identity management system saves a first verifiable claim generated based on the behavior data, the authorization information, the first digital identity information, and the second digital identity information to a blockchain. A supervision organization, when granted an access permission of the first verifiable claim, backtracks the operational behavior of the first user corresponding to the service to be processed based on the first verifiable claim in the blockchain. The first verifiable claim is used to prove that the service device is granted the operation permission.

BRIEF DESCRIPTION OF DRAWINGS

To describe the technical solutions in one or more embodiments of the present specification or in the existing technology more clearly, the following briefly introduces the accompanying drawings for describing the embodiments or the existing technology. Clearly, the accompanying drawings in the following description merely show some embodiments of the present specification, and a person of ordinary skill in the art can still derive other drawings from these accompanying drawings without creative efforts.

DESCRIPTION OF EMBODIMENTS

To make a person skilled in the art understand the technical solutions in one or more embodiments of the present specification better, the following clearly and comprehensively describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present specification.

Figure 1:
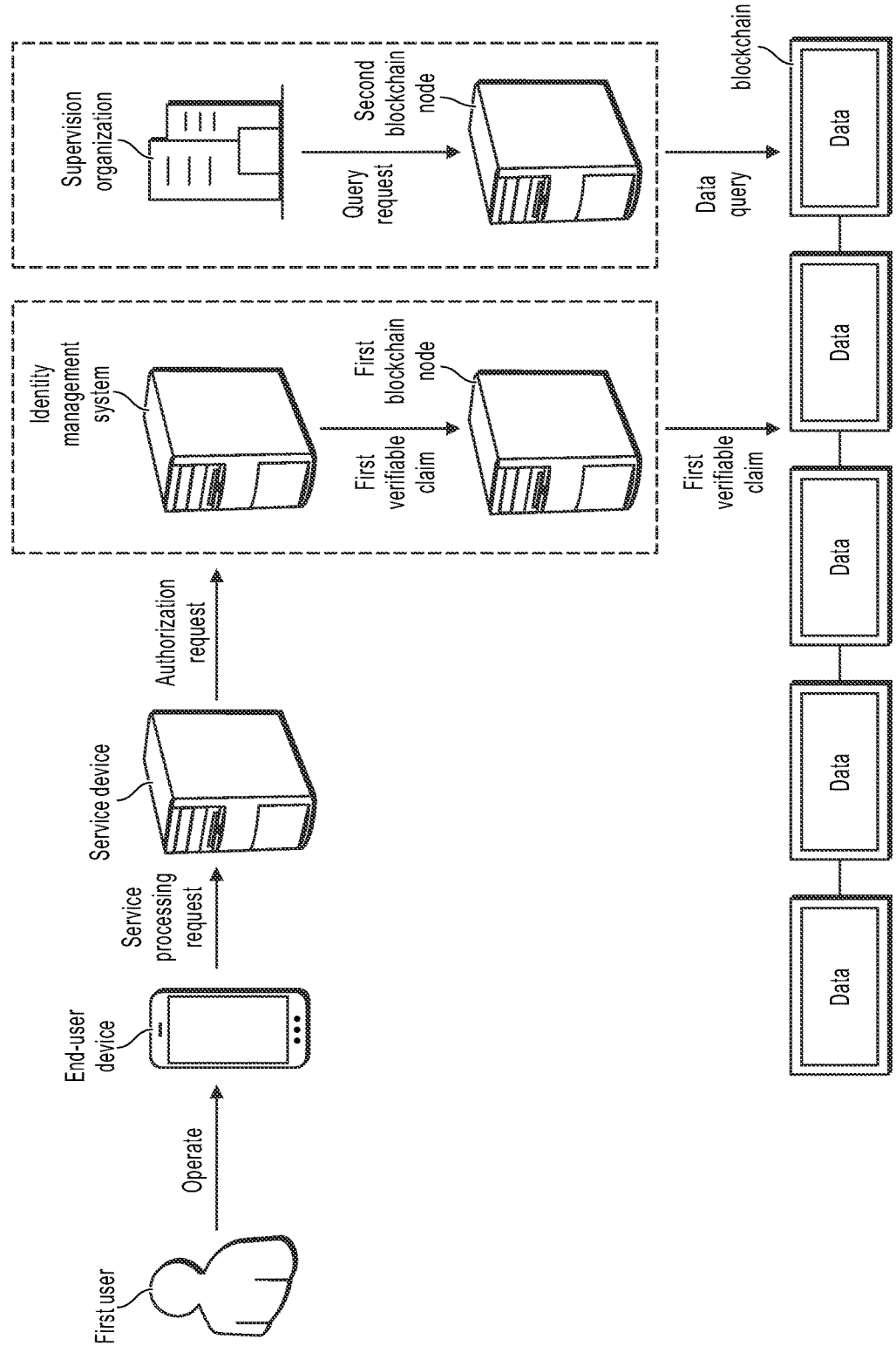
FIG. 1 is a schematic diagram illustrating a first scenario of a method for backtracking a service behavior, according to one or more embodiments of the present specification.

FIG. 1 is a schematic diagram illustrating an application scenario of a method for backtracking a service behavior, according to one or more embodiments of the present specification. As shown in FIG. 1, the scenario includes an end-user device, a service device, an identity management system, a supervision organization, and a blockchain. The end-user device can be a mobile phone, a tablet computer, a desktop computer, a portable notebook computer, etc. (a mobile phone as example shown in FIG. 1). The end-user device is installed with a client device application (hereinafter referred to as a client device) related to service processing, and the client device can be a stand-alone application (app), an applet embedded in a stand-alone application, a web page, etc. The service device can be an independent server or a server cluster composed of a plurality of servers. A first blockchain node connected to a blockchain is deployed in the identity management system, and the blockchain is accessed through the first blockchain node; the identity management system can be a distributed digital identity management system, and implements backtracking of an operational behavior of a user in a service processing process through a distributed digital identity; the identity management system can also be a common digital identity management system; and the identity management system can provide a creation service of a digital identity, an issuance service of verifiable claims (VC), a management service of a data access permission, etc. The supervision organization can deploy a second blockchain node connected to the blockchain and access the blockchain through the second blockchain node. When the supervision organization deploys the second blockchain node connected to the blockchain, the supervision organization can perform data communication with the identity management system, and query data in the blockchain through the identity management system (FIG. 1 only shows that the supervision organization deploys the second blockchain node). Data such as verifiable claims are stored in the blockchain. It is worthwhile to note that the dashed boxes in FIG. 1 indicate that the corresponding main body is deployed with a blockchain node.

Specifically, a first user operates a client device in its end-user device to process a service (that is, a service to be processed), and the client device obtains behavior data of an operational behavior of the first user corresponding to the service to be processed in the client device, and sends a service processing request to the service device based on the obtained behavior data. The service device performs corresponding service processing based on the received service processing request, obtains authorization information on an operation permission for the behavior data granted by the first user to the service device, and sends an authorization request to the identity management system based on the obtained authorization information, the behavior data included in the service processing request, first digital identity information of the first user, and second digital identity information of the service device. The identity management system receives the authorization request sent by the service device, generates a first verifiable claim based on the behavior data, the authorization information, the first digital identity information, and the second digital identity information if the authorization information included in the authorization request is determined to satisfy a predetermined authorization condition, and saves the first verifiable claim to the blockchain, where the first verifiable claim represents that the service device is granted the operation permission for the service data. The supervision organization backtracks the operational behavior of the first user corresponding to the service to be processed based on the first verifiable claim in the blockchain if the supervision organization is determined to be granted an access permission of the first verifiable claim. The digital identity information can be displayed in a variety of ways, such as a decentralized identity (DID), and the DID can also be referred to as a distributed digital identity; and the operational behavior includes a click operational behavior, a sliding operational behavior, an information input behavior, etc. of the user in the client device.

Figure 2:
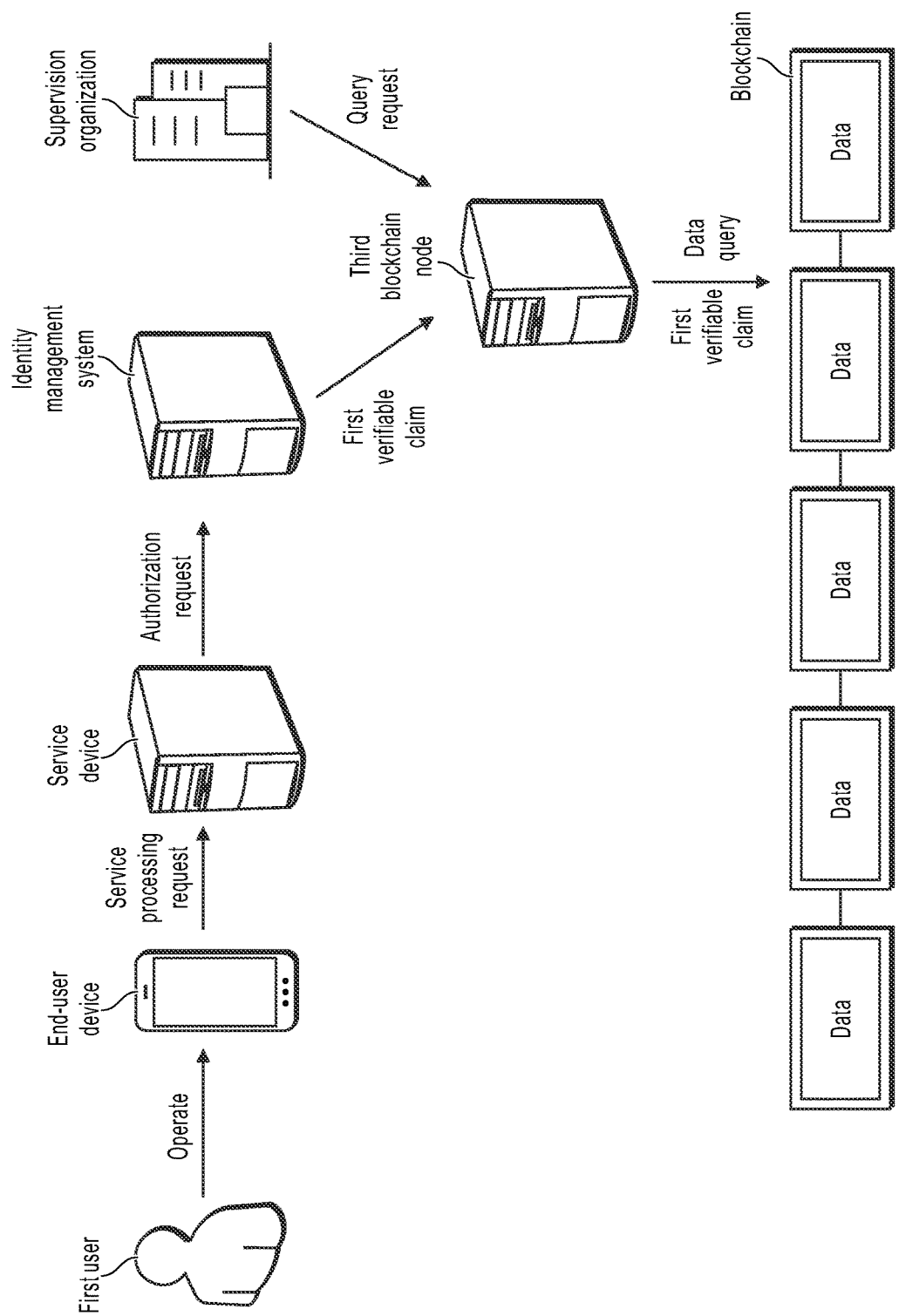
FIG. 2 is a schematic diagram illustrating a second scenario of a method for backtracking a service behavior, according to one or more embodiments of the present specification.

Further, as shown in FIG. 2, the first blockchain node also does not need to be deployed in the identity management system, and the corresponding scenario further includes: a third blockchain node connected to the blockchain. After generating the first verifiable claim, the identity management system sends the first verifiable claim to the third blockchain node; and the third blockchain node saves the received first verifiable claim to the blockchain. Further, when the supervision organization deploys the second blockchain node connected to the blockchain, a query request can also be sent to the third blockchain node, so the third blockchain node can query corresponding data from the blockchain. It should be pointed out that the identity management system and the supervision organization can access the blockchain through the same third blockchain node or through different third blockchain nodes.

As such, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and then share an access permission of the behavior data to the supervision organization, which not only ensures the validity of authorization, but also makes the user be the highest permission manager of the user's own behavior data and safeguards user's rights and interests.

Figure 3:
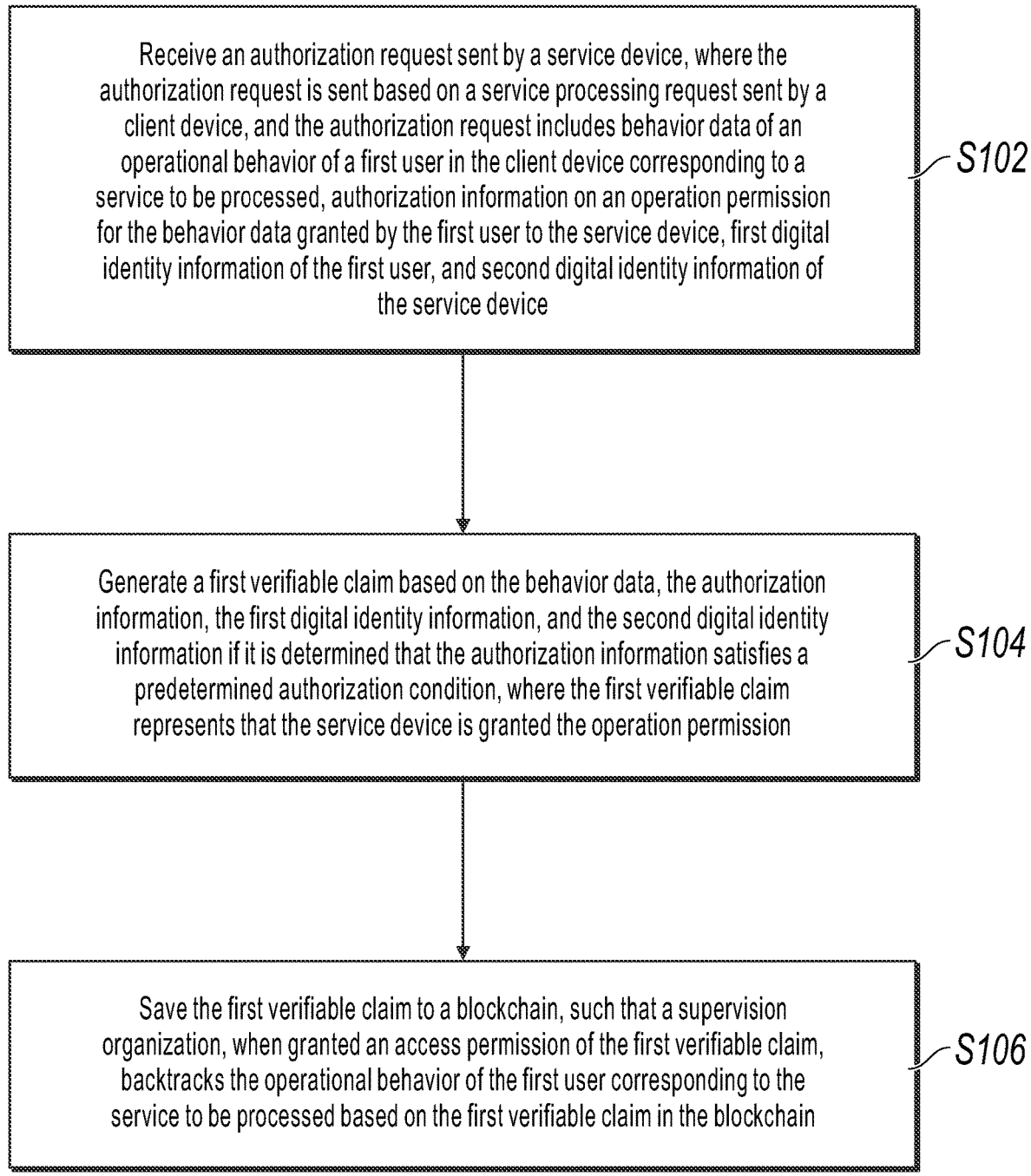
FIG. 3 is a first schematic flowchart illustrating a method for backtracking a service behavior, according to one or more embodiments of the present specification.

FIG. 3 is a schematic flowchart illustrating a method for backtracking a service behavior, according to one or more embodiments of the present specification. The method in FIG. 3 can be executed by the identity management system in FIG. 1. As shown in FIG. 3, the method includes the following steps:

Step S102, an authorization request sent by a service device is received, where the authorization request is sent based on a service processing request sent by a client device, and the authorization request includes behavior data of an operational behavior of a first user in the client device corresponding to a service to be processed, authorization information on an operation permission for the behavior data granted by the first user to the service device, first digital identity information of the first user, and second digital identity information of the service device.

Specifically, the client device includes a service display interface, and the service display interface includes at least one service option such that a user select a service required to be processed (that is, the service to be processed). When detecting a trigger operation (such as click or double click) of the first user on a target service option in the service display interface, the client device displays an authorization interface to inquire whether the first user grants the service device the operation permission for the behavior data of the first user; if obtaining acknowledgment information that the first user acknowledges granting, the client device generates authorization information, sends the authorization information to the service device, and displays a service processing interface corresponding to the target service option; and the client device obtains behavior data of an operational behavior of the first user in the service processing interface, and sends a service processing request to the service device based on the obtained behavior data when detecting a submission operation of the first user. Correspondingly, when receiving the authorization information, the service device saves the authorization information; and, when receiving the service processing request sent by the client device, the service device performs corresponding service processing based on the service processing request, and sends the authorization request to the identity management system based on the behavior data in the service processing request, the saved authorization information, the obtained first digital identity information of the first user, and the second digital identity information of the service device. Or the client device saves the generated authorization information and displays the service processing interface corresponding to the target service option; and the client device obtains behavior data of an operational behavior of the first user in the service processing interface, and sends a service processing request to the service device based on the obtained behavior data and the saved authorization information when detecting a submission operation of the first user. Correspondingly, the service device performs corresponding service processing based on the service processing request, and sends the authorization request to the service device based on the authorization information and the behavior data included in the service processing request, the obtained first digital identity information of the first user, and the second digital identity information of the service device. Or when detecting a trigger operation of the first user on a target service option in the service display interface, the client device displays a service processing interface corresponding to the target service option; the client device obtains behavior data of an operational behavior of the first user in the service processing interface, and displays an authorization interface to inquire whether the first user grants the service device the operation permission for the behavior data of the first user when detecting a submission operation of the first user; and if obtaining acknowledgment information that the first user acknowledges granting, the client device generates authorization information, and sends a service processing request to the service device based on the authorization information and the obtained behavior data. Correspondingly, the service device performs corresponding service processing based on the service processing request, and sends the authorization request to the service device based on the authorization information and the behavior data included in the service processing request, the obtained first digital identity information of the first user, and the second digital identity information of the service device.

The operational behavior can be, for example, a click operational behavior, a sliding operational behavior, an information input behavior, etc. In order to facilitate subsequent backtracking on the operational behavior of the user, the behavior data includes at least one of video data, image data, and text data. The video data can be data obtained when the client device performs screen recording, the image data can be data obtained when the client device performs screen capture, and the text data can be data generated based on the operational behavior of the user for describing the operational behavior, for example, specific text data is generated when user A clicks an OK button at 13:30 on Jul. 4, 2020.

Further, the authorization request can further include first identification information of service data of the service to be processed; and the first identification information can be identification information determined by the client device, and can also be identification information determined by the service device. The service data of the service to be processed can be data generated by the client device based on information submitted by the first user, and can also be data generated by the service device based on the service processing request. For example, the service to be processed is an insurance service, the service data is an insurance policy, and the first identification information is an insurance policy identifier.

Step S104, if it is determined that the authorization information satisfies a predetermined authorization condition, a first verifiable claim is generated based on the behavior data, the authorization information, the first digital identity information, and the second digital identity information, where the first verifiable claim represents that the service device is granted the operation permission.

Step S106, the first verifiable claim is saved to a blockchain, such that a supervision organization, when granted an access permission of the first verifiable claim, backtracks the operational behavior of the first user corresponding to the service to be processed based on the first verifiable claim in the blockchain.

In one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, restores user's operational behavior in the service processing process based on the behavior data in the blockchain to avoid shirking responsibilities when problems occur, standardizes the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

In order to ensure that the operation permission for the behavior data granted by the first user to the service device is based on a real willingness of the first user, the identity management system performs relevant verification after receiving the authorization request in one or more embodiments of the present specification. Optionally, the authorization request further includes first signature data, the first signature data being obtained by signing specified data with a private key corresponding to the first digital identity information of the first user.

Correspondingly, the step that it is determined that the authorization information satisfies the predetermined authorization condition in step S104 includes: a public key corresponding to the first digital identity information is obtained, the first signature data in the authorization request is verified based on the obtained public key, and it is determined that the authorization information satisfies the predetermined authorization condition if the verification succeeds. Specifically, the private key corresponding to the first digital identity information of the first user is saved in a security chip of the end-user device where the client device is located; when detecting the submission operation of the first user, the client device signs at least one of the behavior data and the authorization information with the private key in the security chip of the end-user device to obtain first signature data, and sends the service processing request to the service device based on the first signature data, the behavior information, the authorization information, etc.; and the service device sends the authorization request to the identity management system based on the first signature data, the behavior information, the authorization information, the first digital identity information, the second digital identity information, etc. The identity management system obtains the associated public key from an association relationship between specified digital identity information and the public key based on the first digital identity information included in the authorization request, determines that the authorization information satisfies the predetermined authorization condition if the verification of the first signature data in the authorization request based on the obtained public key succeeds, and generates the first verifiable claim based on the authorization information etc.

Or the step that the authorization information satisfies the predetermined authorization condition in step S104 includes the following.

Verification information to be verified of the first user is obtained, and it is determined that the authorization information satisfies the predetermined authorization condition if the verification information passes verification. For example, the identity management system sends a biometric information acquisition request to the client device, such that the client device collects biometric information of the first user; and if the identity of the first user passes the verification based on the biometric information returned by the client device, it is determined that the authorization information satisfies the predetermined authorization condition. The biometric information is, for example, fingerprints, a face, etc. For another example, the identity management system obtains associated contact information from an association relationship between the specified digital identity information and the contact information based on the first digital identity information, sends verification information to the obtained contact information, and receives verification information sent by the client device; and if the received verification information is determined to match the sent verification information, it is determined that the verification succeeds and the authorization information satisfies the predetermined authorization condition.

Therefore, by verifying the first signature data included in the authorization request or obtaining and verifying the verification information to be verified of the first user, it can be ensured that the operation permission for the behavior data granted to the service device is based on a real willingness of the first user, and user's losses caused by false authorization are avoided.

In order to reduce the occupation of a large storage space in the blockchain by saving the first verifiable claim including the behavior data to the blockchain, in one or more embodiments of the present specification, when receiving the service processing request, the service device performs hash processing on the behavior data based on a predetermined algorithm to obtain a hash value of the behavior data, saves the behavior data to a designated storage area, and sends the authorization request to the identity management system based on the hash value, a storage address of the behavior data, the authorization information, the first digital identity information, and the second digital identity information. The designated storage area is, for example, a cloud storage, and can be set as required.

Correspondingly, the step that the first verifiable claim is generated based on the behavior data, the authorization information, the first digital identity information, and the second digital identity information in step S104 includes: the first verifiable claim is generated based on the hash value, the storage address of the behavior data, the authorization information, the first digital identity information, and the second digital identity information, such that the supervision organization, when granted an access permission of the first verifiable claim, obtains the behavior data from a corresponding storage area based on the storage address included in the first verifiable claim in the blockchain, and backtracks the operational behavior of the first user corresponding to the service to be processed based on the obtained behavior data and the hash value included in the first verifiable claim.

The step that the operational behavior of the first user corresponding to the service to be processed is backtracked based on the obtained behavior data and the hash value included in the first verifiable claim includes: hash processing is performed on the obtained behavior data based on a predetermined algorithm to obtain a hash value; and the obtained hash value is compared with the hash value included in the first verifiable claim, and when the compared hash values are identical, the operational behavior of the first user corresponding to the service to be processed is backtracked based on the obtained behavior data. By comparing the hash values, whether the behavior data has been tampered can be effectively identified, thereby reducing backtracking a wrong operational behavior due to the tampering of the behavior data.

It should be pointed out that the service device can perform the hash processing on only a part of the behavior data, for example, perform the hash processing on video data and image data that need to occupy a large storage space in the behavior data, and can also perform the hash processing on all the behavior data, for example, perform the hash processing on all video data, image data, and text data in the behavior data, which can be set as required in practice.

Figure 4:
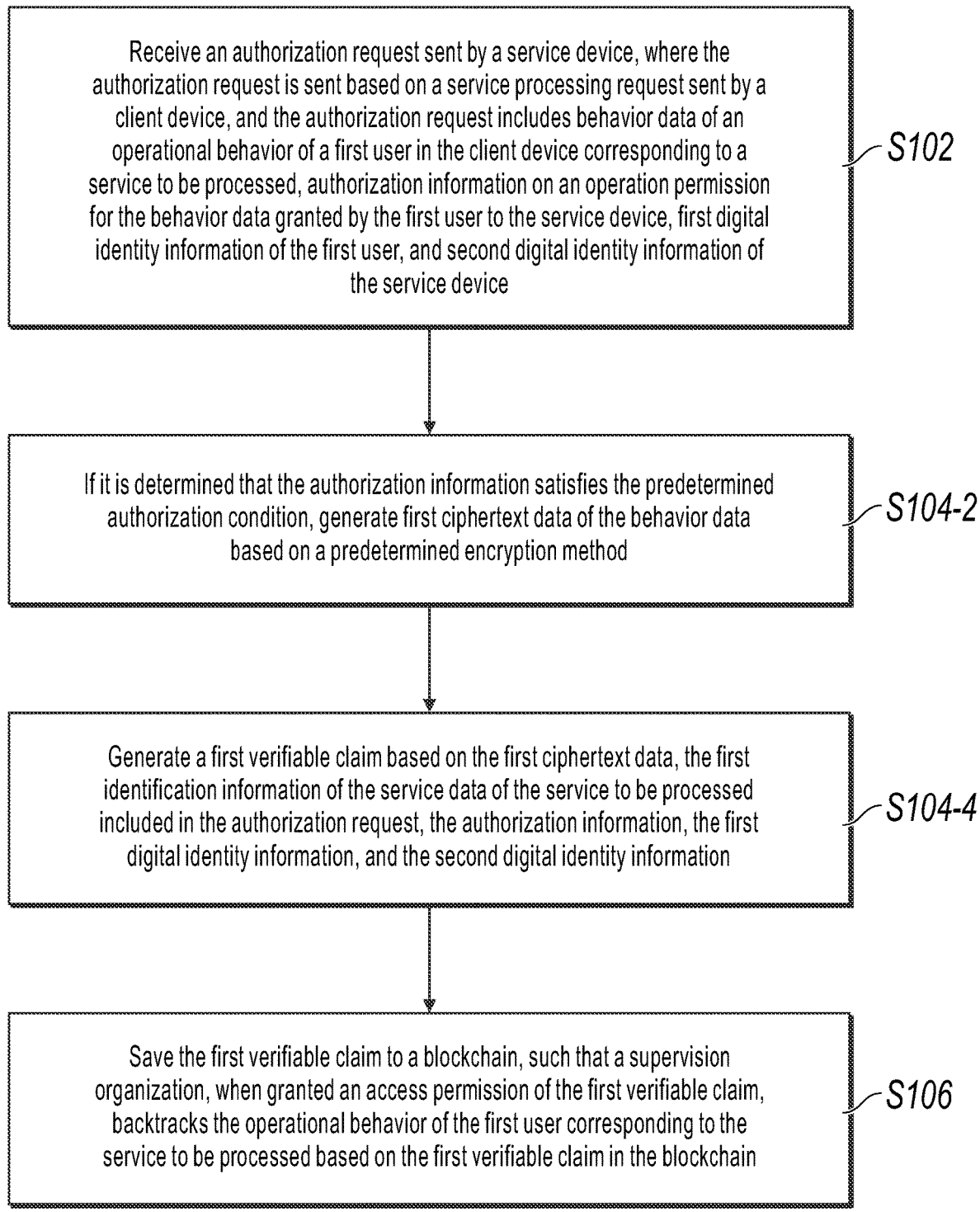
FIG. 4 is a second schematic flowchart illustrating a method for backtracking a service behavior, according to one or more embodiments of the present specification.

Considering that user's behavior data usually includes user's personal information, in order to avoid the leakage of user's personal information, and to facilitate the backtracking of the operational behavior of the first user, the first verifiable claim can be quickly obtained from the blockchain. As shown in FIG. 4, in one or more embodiments of the present specification, step S104 includes the following.

Step S104-2, if it is determined that the authorization information satisfies the predetermined authorization condition, first ciphertext data of the behavior data is generated based on a predetermined encryption method.

Specifically, when the authorization request includes the hash value of all the behavior data and the storage address, because the Hash algorithm is irreversible, there is no risk of leakage of user information. At this time, the identity management system can encrypt only the storage address based on the predetermined encryption algorithm to obtain the first ciphertext data, and can also encrypt the hash value and the storage address to obtain the first ciphertext data. When the authorization request includes the hash value of part of the behavior data and the storage address of the part of the behavior data, for example, the authorization request includes the hash value of the video data, the storage address of the video data, and the text data, the identity management system can encrypt the storage address of the video data and the text data based on the predetermined encryption algorithm to obtain the first ciphertext data, and can also encrypt the hash value of the video data, the storage address of the video data, and the text data based on the predetermined encryption algorithm to obtain the first ciphertext data, which can be set as required in practice.

Step S104-4: a first verifiable claim is generated based on the first ciphertext data, the first identification information of the service data of the service to be processed included in the authorization request, the authorization information, the first digital identity information, and the second digital identity information.

By encrypting the behavior data, the leakage of user information is effectively avoided; the first verifiable claim is generated based on the first identification information of the service data of the service to be processed, and the first verifiable claim is associated with the service to be processed, so when the operational behavior of the first user corresponding to the service to be processed is backtracked, the first verifiable claim can be quickly identified to obtain the behavior data of the first user, which can effectively improve the backtracking efficiency.

Figure 5:
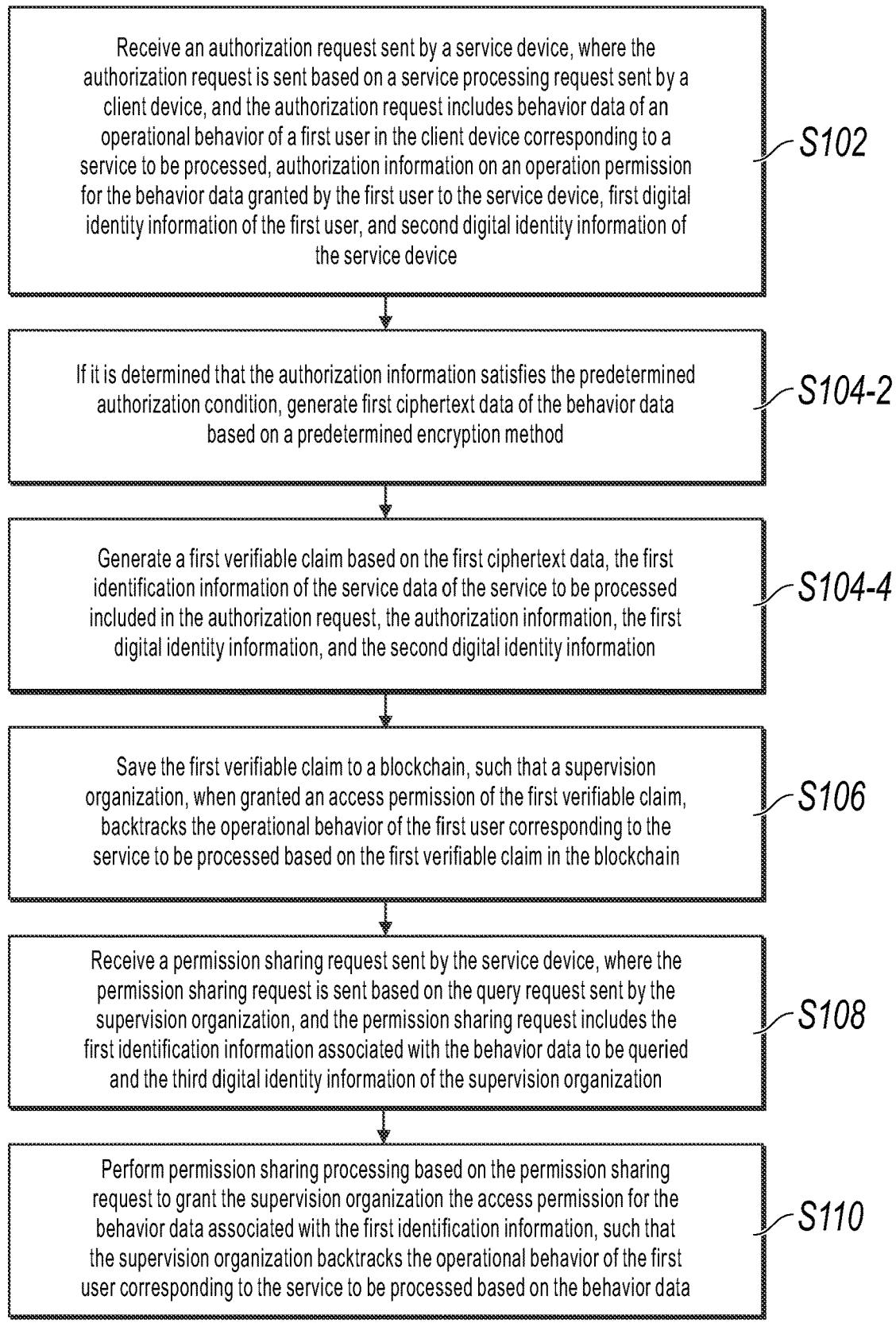
FIG. 5 is a third schematic flowchart illustrating a method for backtracking a service behavior, according to one or more embodiments of the present specification.

In order to avoid look-up of user's behavior data by irrelevant organizations, in one or more embodiments of the present specification, when the supervision organization needs to backtrack user's operational behavior, the supervision organization first sends a query request to the service device such that the service device shares the access permission of the behavior data to the supervision organization. Correspondingly, as shown in FIG. 5, after step S106, the method further includes the following.

Step S108: a permission sharing request sent by the service device is received, where the permission sharing request is sent based on the query request sent by the supervision organization, and the permission sharing request includes the first identification information associated with the behavior data to be queried and the third digital identity information of the supervision organization.

Step S110: permission sharing processing is performed based on the permission sharing request to grant the supervision organization the access permission for the behavior data associated with the first identification information, such that the supervision organization backtracks the operational behavior of the first user corresponding to the service to be processed based on the behavior data.

Figure 6:
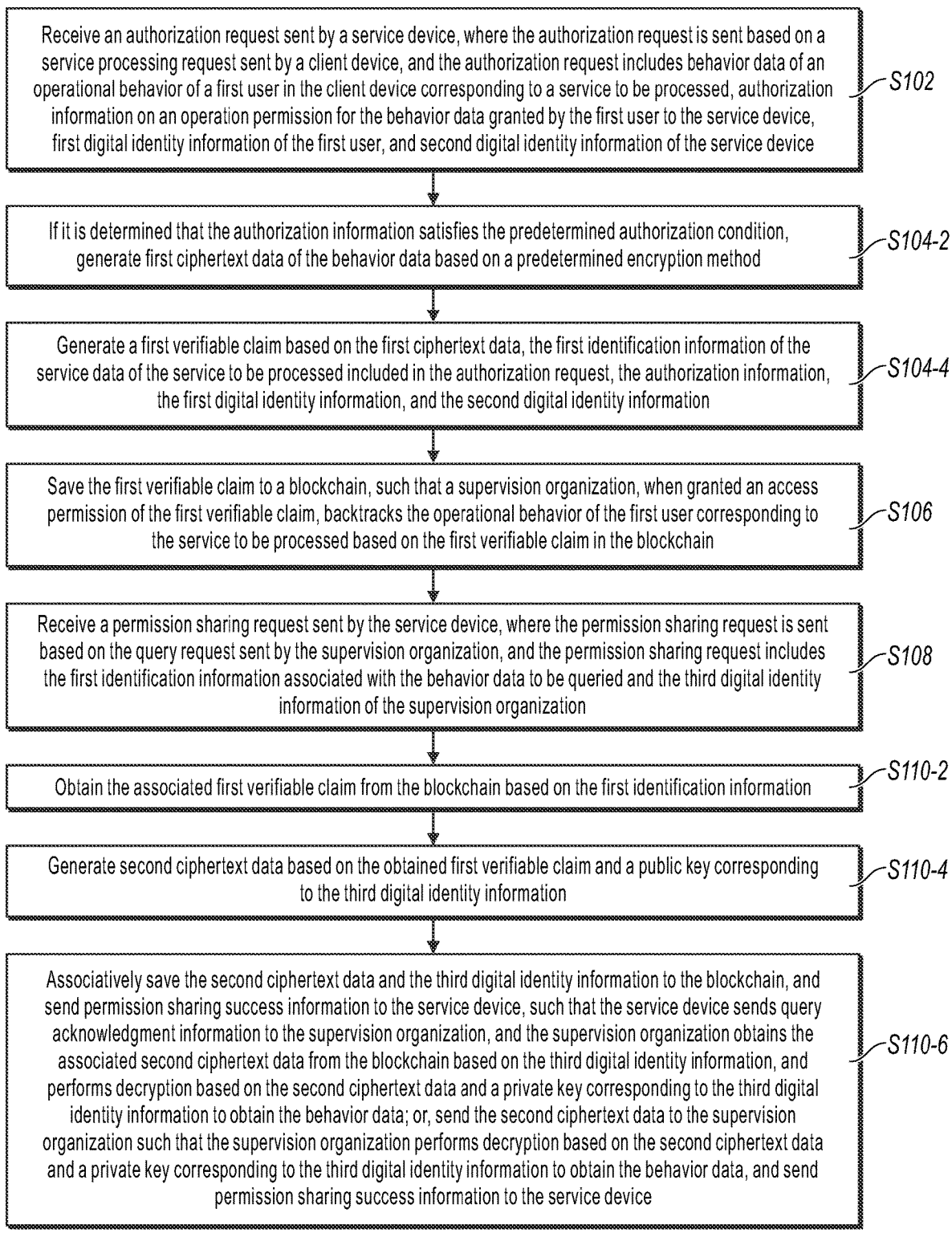
FIG. 6 is a fourth schematic flowchart illustrating a method for backtracking a service behavior, according to one or more embodiments of the present specification.

Specifically, as shown in FIG. 6, step S110 includes the following.

Step S110-2: the associated first verifiable claim is obtained from the blockchain based on the first identification information.

Step S110-4: second ciphertext data is generated based on the obtained first verifiable claim and a public key corresponding to the third digital identity information.

Step S110-6: the second ciphertext data and the third digital identity information are associatively saved to the blockchain, and permission sharing success information is sent to the service device, such that the service device sends query acknowledgment information to the supervision organization, and the supervision organization obtains the associated second ciphertext data from the blockchain based on the third digital identity information, and performs decryption based on the second ciphertext data and a private key corresponding to the third digital identity information to obtain the behavior data; or, the second ciphertext data is sent to the supervision organization, such that the supervision organization performs decryption based on the second ciphertext data and a private key corresponding to the third digital identity information to obtain the behavior data, and permission sharing success information is sent to the service device.

The supervision organization can register on a backtracking management platform and become a user of the backtracking management platform. It is understandable that the supervision organization user operates the backtracking management platform to send the query request to the service device after logging in the backtracking management platform; the service device sends the query acknowledgment information to an account of the supervision organization in the backtracking management platform after receiving the permission sharing success information sent by the identity management system; or the identity management system sends the second ciphertext data to the account of the supervision organization in the backtracking management platform, and the supervision organization can browse the user's behavior data after logging in the backtracking management platform. That is, the backtracking management platform is a display center of "verification" and "replay" for the user behavior data, and supports relevant behavior backtracking query and management.

It should be pointed out that a service provider can also register on the backtracking management platform and become a user of the backtracking management platform, so as to look up the behavior data of the user who has processed the corresponding service based on the backtracking management platform.

In order to facilitate the tracing of the sharing of the permission, after step S110, the method can further include the following: sharing record information is generated based on the first identification information of the service data of the service to be processed, the second digital identity information, the third digital identity information, etc., and the sharing record information is saved to the blockchain.

As such, only when receiving the query request sent by the supervision organization, the service device shares the access permission of the behavior data to the supervision organization, so the behavior data will not be widely looked up, and the risk of user information leakage can be reduced.

Figure 7:
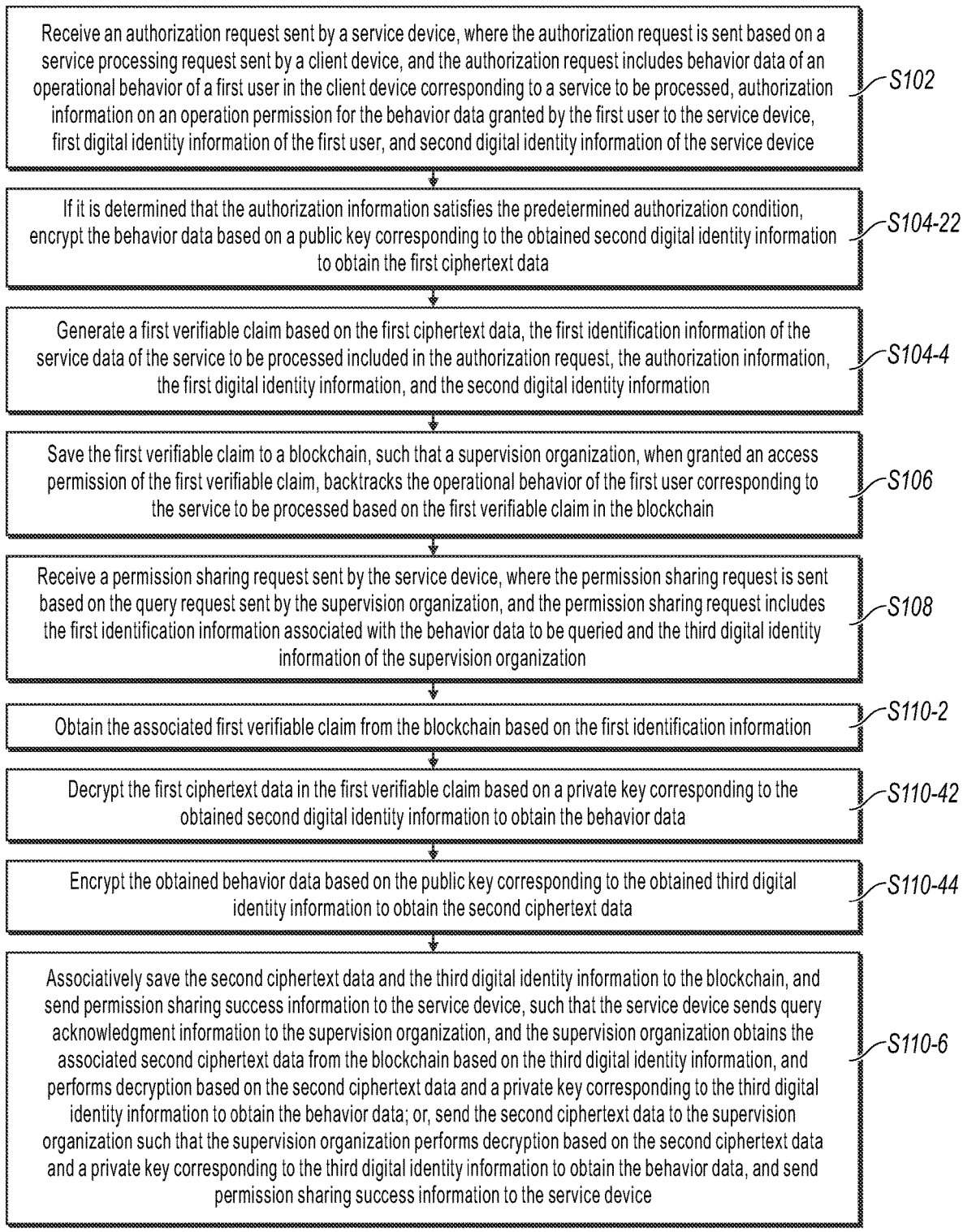
FIG. 7 is a fifth schematic flowchart illustrating a method for backtracking a service behavior, according to one or more embodiments of the present specification.

In order to realize the sharing of the access permission of the behavior data, in one or more embodiments of the present specification, as shown in FIG. 7, previous step S104-2 can include step S104-22 below.

Step S104-22: if it is determined that the authorization information satisfies the predetermined authorization condition, the behavior data is encrypted based on a public key corresponding to the obtained second digital identity information to obtain the first ciphertext data.

Corresponding to step S104-22, as shown in FIG. 7, step S110-4 includes steps S110-42 and S110-44 below.

Step S110-42: the first ciphertext data in the first verifiable claim is decrypted based on a private key corresponding to the obtained second digital identity information to obtain the behavior data.

Step S110-44: the obtained behavior data is encrypted based on a public key corresponding to the obtained third digital identity information to obtain the second ciphertext data.

When the first verifiable claim is generated above, the behavior data is encrypted using the public key corresponding to the second digital identity information of the service device to avoid the leakage of the behavior data. The supervision organization only has a private key corresponding to its own third digital identity information, and cannot obtain the private key corresponding to the second digital identity information of the service device, so when the permission is shared, the first ciphertext data is decrypted based on the private key corresponding to the second digital identity information to obtain the behavior data, and then the digital identity information is encrypted based on the public key corresponding to the third digital identity information, such that the supervision organization can decrypt the second ciphertext data based on the private key corresponding to the third digital identity information to obtain the behavior data. As such, whether the second ciphertext data is saved to the blockchain or sent to the supervision organization, the behavior data is always in a ciphertext state, which realizes the sharing of the access permission of the behavior data while ensuring the security of user information.

Further, when the second ciphertext data is saved to the blockchain such that the supervision organization can obtain the second ciphertext data from the blockchain, considering that when there are many supervision organizations, the second ciphertext data needs to be saved to the blockchain during each permission sharing process in the previously described access permission sharing method, more storage space in the blockchain will be occupied, and the same behavior data has multiple different ciphertext data, which is inconvenient for management, in one or more embodiments of the present specification, the sharing of the permission can also be implemented by sharing an encryption key. Specifically, as shown in FIG. 8, previous step S104-2 can include the following step S104-24.

Step S104-24: if it is determined that the authorization information satisfies the predetermined authorization condition, a first key of the service device is determined, and the behavior data is encrypted based on the first key to obtain the first ciphertext data.

The first key can be a key designated for the service device, and can also be an encryption key allocated by the identity management system to the service device for permission sharing. In order to ensure security, the first key can also be dynamically changed every time the permission is shared, so the leakage of user information caused by the leakage of the first key can be avoided.

Figure 8:
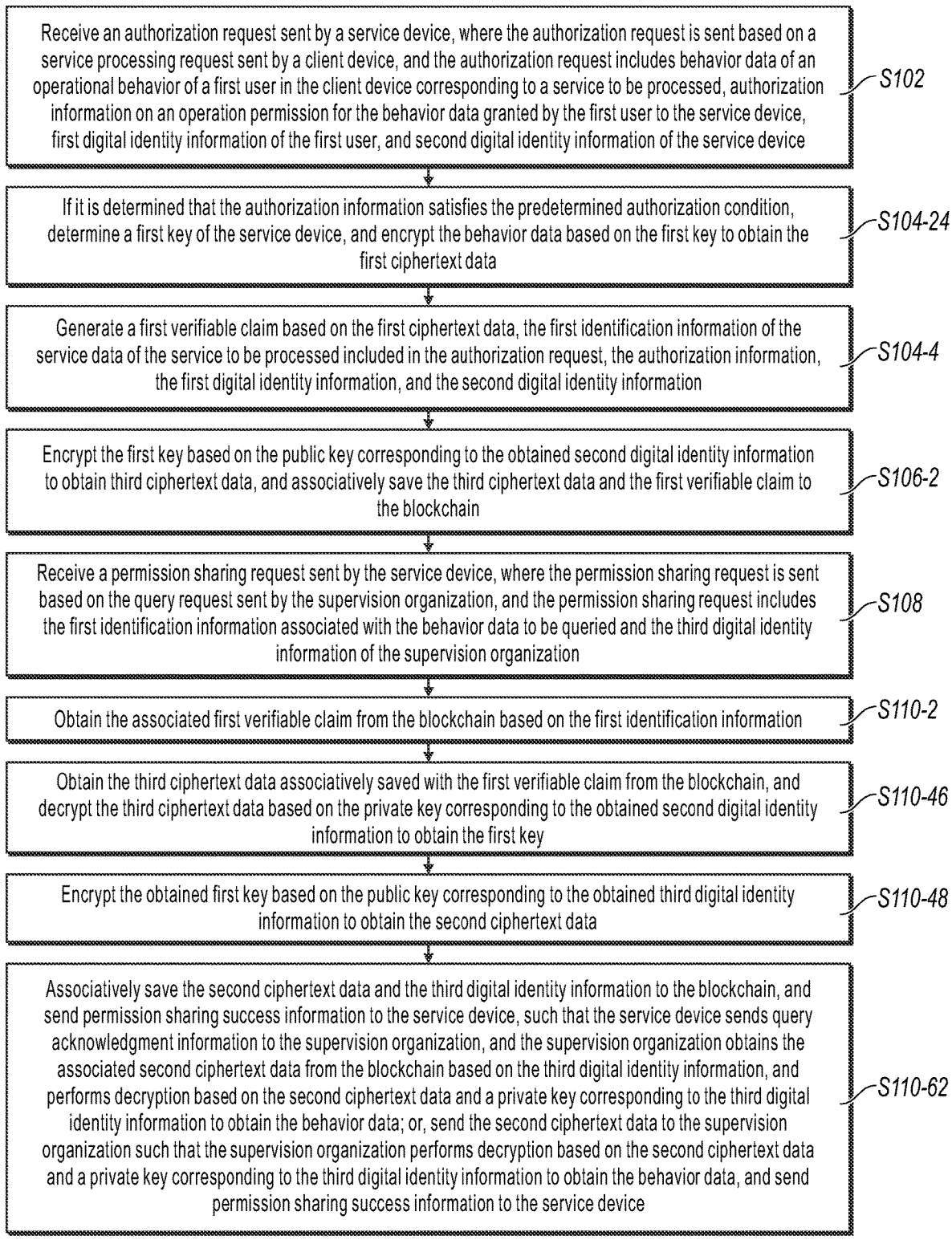
FIG. 8 is a sixth schematic flowchart illustrating a method for backtracking a service behavior, according to one or more embodiments of the present specification.

Corresponding to step S104-24, as shown in FIG. 8, step S106 includes the following step S106-2.

Step S106-2: the first key is encrypted based on the public key corresponding to the obtained second digital identity information to obtain third ciphertext data, and the third ciphertext data and the first verifiable claim are associatively saved to the blockchain.

Further, corresponding to steps S104-24 and S106-2, as shown in FIG. 8, previous step S110-4 includes the following steps S110-46 and S110-48.

Steps S110-46: the third ciphertext data associatively saved with the first verifiable claim is obtained from the blockchain, and the third ciphertext data is decrypted based on the private key corresponding to the obtained second digital identity information to obtain the first key.

Steps S110-48: the obtained first key is encrypted based on the public key corresponding to the obtained third digital identity information to obtain the second ciphertext data.

Furthermore, as shown in FIG. 8, step S110-6 includes the following step S110-62.

Steps S110-62: the first identification information, the second ciphertext data, and the third digital identity information are associatively saved to the blockchain, such that the supervision organization obtains the associated second ciphertext data and first identification information from the blockchain based on the third digital identity information, decrypts the obtained second ciphertext data based on the private key corresponding to the third digital identity information to obtain the first key, obtains the associated first verifiable claim from the blockchain based on the obtained first identification information, and decrypts the first ciphertext data in the first verifiable claim based on the obtained first key to obtain the behavior data; or, the first ciphertext data and the second ciphertext data are sent to the supervision organization, such that the supervision organization decrypts the second ciphertext data based on the private key corresponding to the third digital identity information to obtain the first key, and decrypts the first ciphertext data based on the first key to obtain the behavior data.

As such, when the first verifiable claim is generated, the behavior data is encrypted with the first key and the first key is encrypted with the public key corresponding to the second digital identity information of the service device, which avoids the leakage of the behavior data and the first key. The supervision organization only has the private key corresponding to its own third digital identity information, cannot obtain the private key corresponding to the second digital identity information of the service device, and cannot obtain the first key, so when the permission is shared, the third ciphertext data is first decrypted based on the private key corresponding to the second digital identity information to obtain the first key, and then the first key is encrypted based on the public key corresponding to the third digital identity information, such that the supervision organization can decrypt the second ciphertext data based on the private key corresponding to the third digital identity information to obtain the first key, and then decrypt the first ciphertext data in the first verifiable claim to obtain the behavior data based on the first key. As such, whether the second ciphertext data is saved to the blockchain or sent to the supervision organization, the first key is always in a ciphertext state, which realizes the sharing of the access permission of the behavior data while ensuring the security of the user information and the first key. In addition, because the third ciphertext data storing the first key does not occupy too much storage space, the storage pressure of the blockchain can be alleviated.

Figure 9:
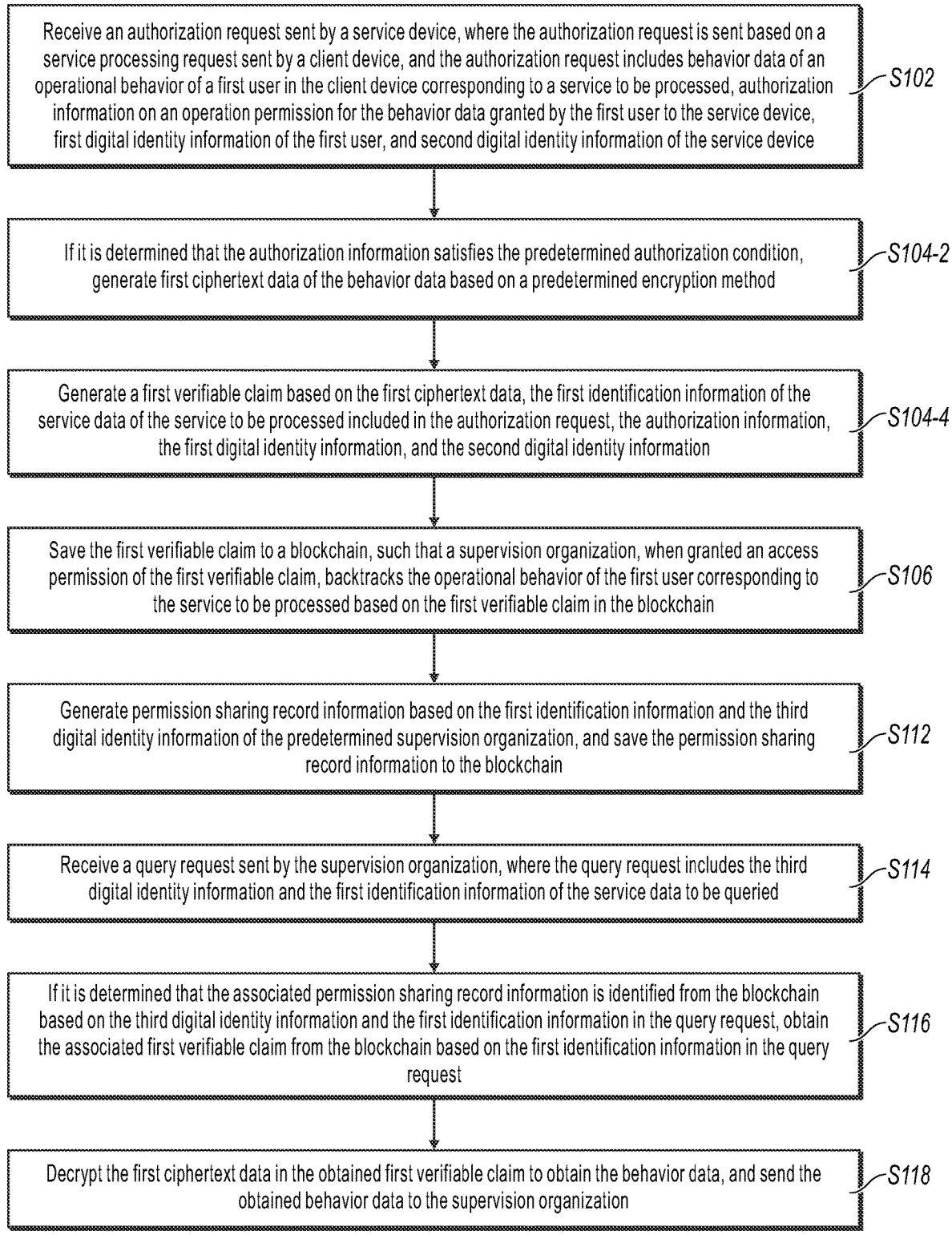
FIG. 9 is a seventh schematic flowchart illustrating a method for backtracking a service behavior, according to one or more embodiments of the present specification.

The access permission of the behavior data is shared to the corresponding supervision organization by the previously described method based on the supervision organization sending a query request. In one or more embodiments of the present specification, a default supervision organization that can access behavior data of a user can also be predetermined. Specifically, as shown in FIG. 9, after step S106, the method further includes the following.

Step S112: permission sharing record information is generated based on the first identification information and the third digital identity information of the predetermined supervision organization, and the permission sharing record information is saved to the blockchain;

Step S114: a query request sent by the supervision organization is received, where the query request includes the third digital identity information and the first identification information of the service data to be queried;

Step S116: if it is determined that the associated permission sharing record information is identified from the blockchain based on the third digital identity information and the first identification information in the query request, the associated first verifiable claim is obtained from the blockchain based on the first identification information in the query request.

Step S118: the first ciphertext data in the obtained first verifiable claim is decrypted to obtain the behavior data, and the obtained behavior data is sent to the supervision organization.

Specifically, when the behavior data is encrypted to obtain the first ciphertext data by using the public key corresponding to the second digital identity information, the first ciphertext data is decrypted to obtain the behavior data by using the private key corresponding to the second digital identity information; and when the behavior data is encrypted with the first key, as described previously, the third ciphertext data is first decrypted to obtain the first key by using the public key corresponding to the second digital identity information, and then the first ciphertext data is decrypted to obtain the behavior data by using the first key.

It should be pointed out that step S118 can also implement the sharing of the permission as previous steps S110-4 and S110-6, which can be referred to the previous description. Details are omitted here for simplicity.

By generating a permission sharing record based on the third digital identity information of each predetermined supervision organization, permission sharing of a plurality of supervision organizations can be implemented in one operation without more permission sharing processes, which improves the efficiency of permission sharing.

Further, in order to enable the supervision organization to backtrack the service to be processed in time, in one or more embodiments of the present specification, the method further includes the following: a message subscription request sent by the supervision organization is received, message subscription processing is performed based on the message subscription request, and message subscription success information is sent to the supervision organization; and if it is determined that the first verifiable claim is successfully saved to the blockchain, push information is sent to the supervision organization, such that the supervision organization, when granted the access permission of the first verifiable claim, backtracks the operational behavior of the first user corresponding to the service to be processed based on the first verifiable claim in the blockchain.

Further, considering that some users do not apply for digital identity information when processing a service through the client device, in order to ensure smooth processing of the service, in one or more embodiments of the present specification, before step S102, the method further includes the following: an application request for digital identity information sent by the service device is received, where the application request includes user information of the first user; first digital identity information of the first user is generated based on the application request; and the first digital identity information and the user information are associatively saved, and the first digital identity information is sent to the service device, such that the service device sends the first digital identity information to the client device. Specifically, when determining that the first digital identity information of the first user is not included in the received service processing request, the service device obtains the user information of the first user, and sends the application request for digital identity information to the identity management system based on the obtained user information, and the identity management system generates the first digital identity information based on the application request.

In order to facilitate processing such as verification, the identity management system also allocates a public and private key pair corresponding to the first digital identity information after generating the first digital identity information, associatively saves the first digital identity information and the public key in the public and private key pair, and sends the private key to the end-user device where the client device is located, such that the end-user device saves the private key to the security chip to ensure the security of the private key.

It should be pointed out that the previously described second digital identity information and third digital identity information are applied from the identity management system. The process of generating the second digital identity information and the third digital identity information by the identity management system is the same as the process of generating the first digital identity information. In order to share the access permission of the behavior data, the public and private key pair corresponding to the second digital identity information of the service device is managed by the identity management system.

In one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Figure 10:
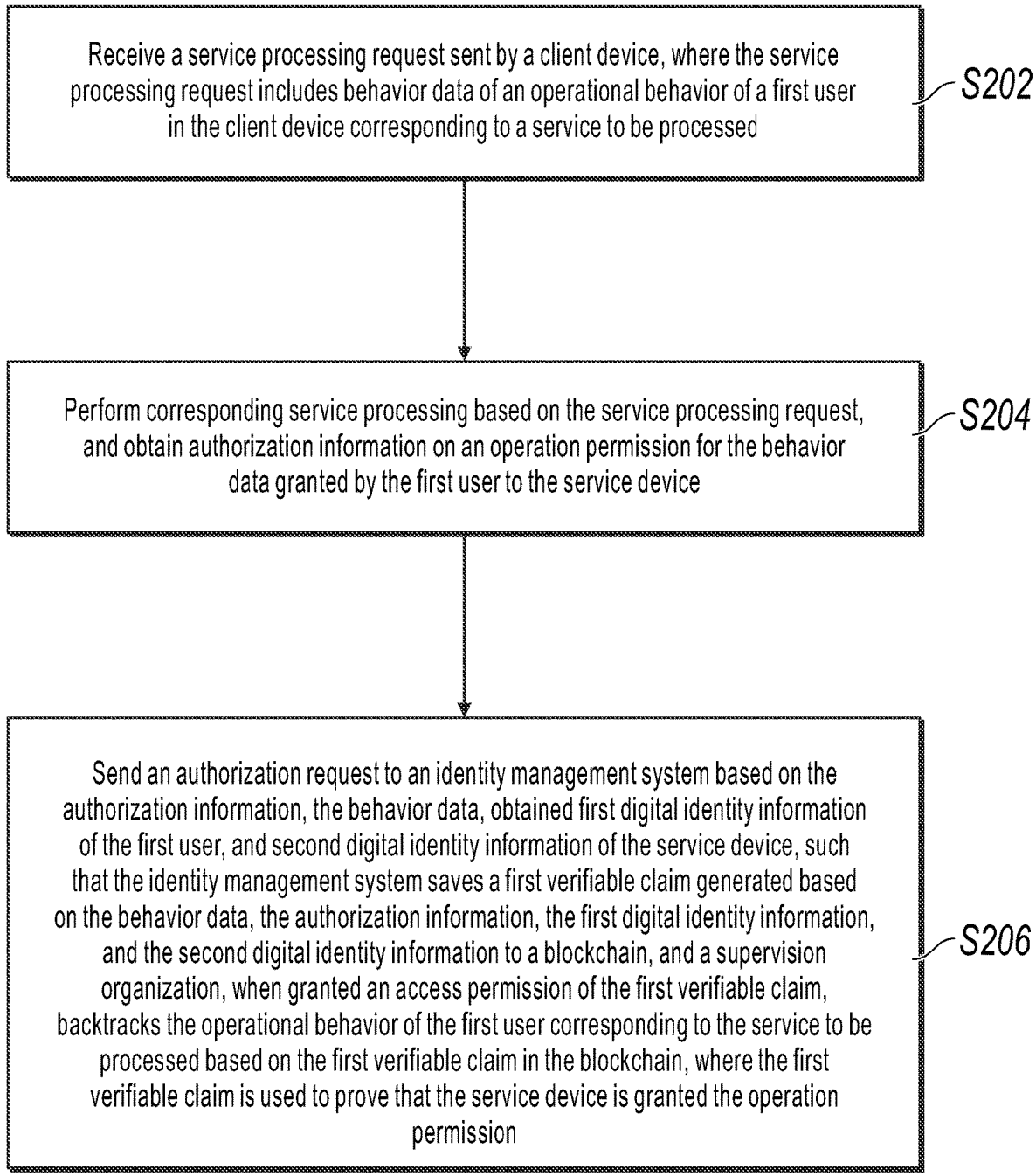
FIG. 10 is an eighth schematic flowchart illustrating a method for backtracking a service behavior, according to one or more embodiments of the present specification.

Corresponding to the method of backtracking a service behavior described in FIGS. 3 to 9, based on the same technical concept, one or more embodiments of the present specification further provide another method of backtracking a service behavior. FIG. 10 is a schematic flowchart illustrating another method for backtracking a service behavior, according to one or more embodiments of the present specification. The method in FIG. 10 can be executed by the service device in FIG. 1. As shown in FIG. 10, the method includes the following steps.

Step S202: a service processing request sent by a client device is received, where the service processing request includes behavior data of an operational behavior of a first user in the client device corresponding to a service to be processed.

The behavior data includes one or more of video data, image data, and text data.

Step S204: corresponding service processing is performed based on the service processing request, and authorization information on an operation permission for the behavior data granted by the first user to the service device is obtained.

The service processing method varies with different services, and can be set as required in practice. The authorization information on the operation permission for the behavior data granted by the first user to the service device can be obtained from the service processing request, and can also be obtained from the authorization information saved by itself. For the specific obtaining method, reference can be made to the previous description, and details are omitted here for simplicity.

Step S206: an authorization request is sent to an identity management system based on the authorization information, the behavior data, obtained first digital identity information of the first user, and second digital identity information of the service device, such that the identity management system saves a first verifiable claim generated based on the behavior data, the authorization information, the first digital identity information, and the second digital identity information to a blockchain, and a supervision organization, when granted an access permission of the first verifiable claim, backtracks the operational behavior of the first user corresponding to the service to be processed based on the first verifiable claim in the blockchain, where the first verifiable claim is used to prove that the service device is granted the operation permission.

In one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

In order to reduce the occupation of a large storage space in the blockchain by saving the first verifiable claim including the behavior data to the blockchain, in one or more embodiments of the present specification, after step S202, the method can further include the following:

Hash processing is performed on the behavior data based on a predetermined algorithm to obtain a hash value of the behavior data; and the behavior data is saved to a designated storage area.

Correspondingly, in step S206, the step that an authorization request is sent to an identity management system based on the authorization information, the behavior data, obtained first digital identity information of the first user, and second digital identity information of the service device includes: the authorization request is sent to the identity management system based on the authorization information, the hash value of the behavior data, a storage address of the behavior data, the first digital identity information, and the second digital identity information.

Figure 11:
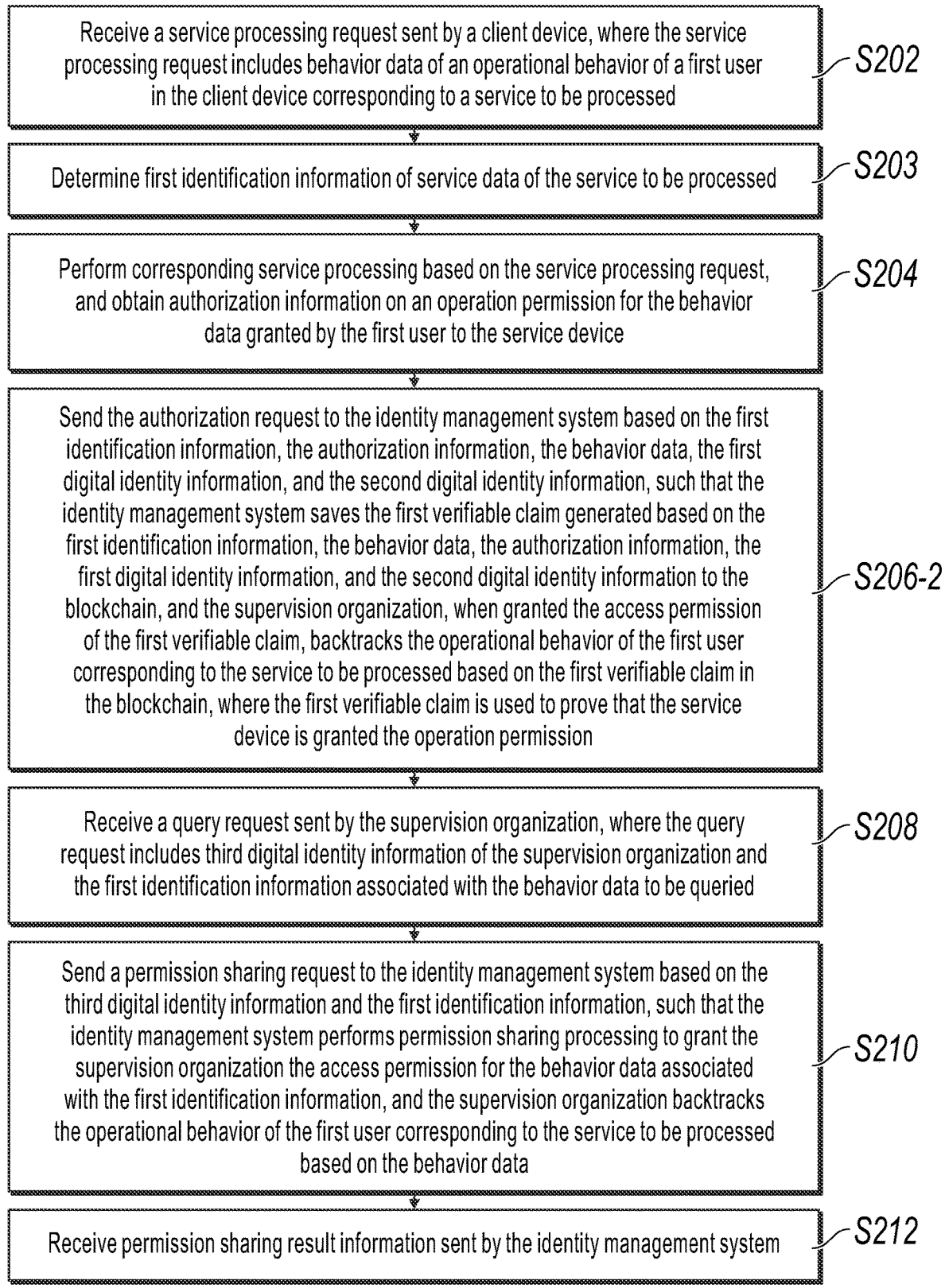
FIG. 11 is a ninth schematic flowchart illustrating a method for backtracking a service behavior, according to one or more embodiments of the present specification.

Further, in order to quickly obtain the first verifiable claim from the blockchain when the operational behavior of the first user is backtracked, in one or more embodiments of the present specification, as shown in FIG. 11, after step S202, the method further includes the following step S203.

Step S203: first identification information of service data of the service to be processed is determined.

The first identification information can be information generated by the client device and included in the service processing request, and can also be information generated by the service device based on the service processing request.

Corresponding to step S203, as shown in FIG. 11, step S206 includes the following step S206-2.

Step S206-2: the authorization request is sent to the identity management system based on the first identification information, the authorization information, the behavior data, the first digital identity information, and the second digital identity information, such that the identity management system saves the first verifiable claim generated based on the first identification information, the behavior data, the authorization information, the first digital identity information, and the second digital identity information to the blockchain, and the supervision organization, when granted the access permission of the first verifiable claim, backtracks the operational behavior of the first user corresponding to the service to be processed based on the first verifiable claim in the blockchain, where the first verifiable claim is used to prove that the service device is granted the operation permission.

Further, as shown in FIG. 11, after step S206-2, the method can further include the following.

Step S208: a query request sent by the supervision organization is received, where the query request includes third digital identity information of the supervision organization and the first identification information associated with the behavior data to be queried;

Step S210: a permission sharing request is sent to the identity management system based on the third digital identity information and the first identification information, such that the identity management system performs permission sharing processing to grant the supervision organization the access permission for the behavior data associated with the first identification information, and the supervision organization backtracks the operational behavior of the first user corresponding to the service to be processed based on the behavior data; and Step S212: permission sharing result information sent by the identity management system is received.

By determining the first identification information of the service data of the service to be processed, and sending the authorization information to the identity management system based on the first identification information, the identity management system generates the first verifiable claim based on the first identification information, and the first verifiable claim can be associated with the service to be processed, so when receiving the query request sent by the supervision organization, the identity management system can quickly obtain the corresponding first verifiable claim from the blockchain during the permission sharing process, which improves the permission sharing efficiency.

Further, considering that some users do not have digital identity information when processing a service through the client device, in order to ensure smooth processing of the service, in one or more embodiments of the present specification, before step S206, the method further includes the following: if it is determined that the service processing request does not include the first digital identity information of the first user, user information of the first user is obtained; an application request for digital identity information is sent to the identity management system based on the obtained identity information of the first user, such that the identity management system generates the first digital identity information of the first user, and associatively saves the first digital identity information with the user information; and the first digital identity information sent by the identity management system is received, and the first digital identity information is sent to the client device.

It should be pointed out that the specific implementation processes of previous steps S202 to S212 can be referred to the previous descriptions. Details are omitted here for simplicity.

In one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Figure 12:
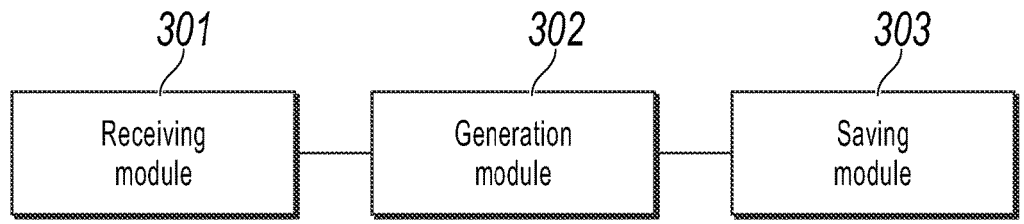
FIG. 12 is a schematic diagram illustrating a first module composition of an apparatus for backtracking a service behavior, according to one or more embodiments of the present specification.

Corresponding to the method for backtracking a service behavior previously described in FIGS. 3 to 9, based on the same technical concept, one or more embodiments of the present specification further provide an apparatus for backtracking a service behavior. FIG. 12 is a schematic diagram illustrating a module composition of an apparatus for backtracking a service behavior, according to one or more embodiments of the present specification. The apparatus is configured to execute the method for backtracking a service behavior described in FIGS. 3 to 9. As shown in FIG. 12, the apparatus includes: a receiving module 301, configured to receive an authorization request sent by a service device, where the authorization request is sent based on a service processing request sent by a client device, and the authorization request includes behavior data of an operational behavior of a first user in the client device corresponding to a service to be processed, authorization information on an operation permission for the behavior data granted by the first user to the service device, first digital identity information of the first user, and second digital identity information of the service device; a generation module 302, configured to, if it is determined that the authorization information satisfies a predetermined authorization condition, generate a first verifiable claim based on the behavior data, the authorization information, the first digital identity information, and the second digital identity information, where the first verifiable claim represents that the service device is granted the operation permission; and a saving module 303, configured to save the first verifiable claim to a blockchain, such that a supervision organization, when granted an access permission of the first verifiable claim, backtracks the operational behavior of the first user corresponding to the service to be processed based on the first verifiable claim in the blockchain.

In the apparatus for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Optionally, the authorization request further includes: first identification information of service data of the service to be processed; the generation module 302 is configured to generate first ciphertext data of the behavior data based on a predetermined encryption method, and generate the first verifiable claim based on the first identification information, the first ciphertext data, the authorization information, the first digital identity information, and the second digital identity information.

Optionally, the apparatus further includes: a first permission processing module; the receiving module 301 is also configured to receive a permission sharing request sent by the service device after the saving module 303 saves the first verifiable claim to the blockchain, where the permission sharing request is sent based on a query request sent by the supervision organization, and the permission sharing request includes the first identification information associated with the behavior data to be queried; the first permission processing module is configured to perform permission sharing processing based on the permission sharing request to grant the supervision organization the access permission for the behavior data associated with the first identification information, such that the supervision organization backtracks the operational behavior of the first user corresponding to the service to be processed based on the behavior data.

Optionally, the permission sharing request further includes: third digital identity information of the supervision organization; the first permission processing module is configured to obtain the associated first verifiable claim from the blockchain based on the first identification information, generate second ciphertext data based on the obtained first verifiable claim and a public key corresponding to the third digital identity information, and associatively save the second ciphertext data and the third digital identity information to the blockchain, and send permission sharing success information to the service device, such that the service device sends query acknowledgment information to the supervision organization, and the supervision organization obtains the associated second ciphertext data from the blockchain based on the third digital identity information, and performs decryption based on the second ciphertext data and a private key corresponding to the third digital identity information to obtain the behavior data; or, send the second ciphertext data to the supervision organization such that the supervision organization performs decryption based on the second ciphertext data and a private key corresponding to the third digital identity information to obtain the behavior data, and send permission sharing success information to the service device.

Optionally, the generation module 302 is configured to encrypt the behavior data based on a public key corresponding to the second digital identity information to obtain the first ciphertext data; the first permission processing module is configured to decrypt the first ciphertext data in the first verifiable claim based on a private key corresponding to the obtained second digital identity information to obtain the behavior data, and encrypt the obtained behavior data based on the public key corresponding to the obtained third digital identity information to obtain the second ciphertext data.

Optionally, the generation module 302 is configured to determine a first key of the service device, and encrypt the behavior data based on the first key to obtain the first ciphertext data; the saving module 303 is configured to encrypt the first key based on the public key corresponding to the obtained second digital identity information to obtain third ciphertext data, and associatively save the third ciphertext data with the first verifiable claim to the blockchain.

Correspondingly, the first permission processing module is configured to obtain the third ciphertext data associatively saved with the first verifiable claim from the blockchain;

decrypt the third ciphertext data based on the private key corresponding to the obtained second digital identity information to obtain the first key; encrypt the obtained first key based on the public key corresponding to the obtained third digital identity information to obtain the second ciphertext data; and associatively save the first identification information, the second ciphertext data, and the third digital identity information to the blockchain; or, send the first ciphertext data and the second ciphertext data to the supervision organization.

Optionally, the apparatus further includes: a second permission processing module; the second permission processing module is configured to, after the saving module 303 saves the first verifiable claim to the blockchain, generate permission sharing record information based on the first identification information and the third digital identity information of the predetermined supervision organization, and save the permission sharing record information to the blockchain; receive a query request sent by the supervision organization, where the query request includes the third digital identity information and the first identification information of the service data to be queried; if it is determined that the associated permission sharing record information is identified from the blockchain based on the third digital identity information and the first identification information in the query request, the associated first verifiable claim is obtained from the blockchain based on the first identification information; and decrypt the first ciphertext data in the obtained first verifiable claim to obtain the behavior data, and send the obtained behavior data to the supervision organization.

Optionally, the apparatus further includes: a subscription processing module; the receiving module 301 is configured to receive a message subscription request sent by the supervision organization; the subscription processing module is configured to perform message subscription processing based on the message subscription request, send message subscription success information to the supervision organization, and if it is determined that the first verifiable claim is successfully saved to the blockchain, send push information to the supervision organization, such that the supervision organization, when granted the access permission of the first verifiable claim, backtracks the operational behavior of the first user corresponding to the service to be processed based on the first verifiable claim in the blockchain.

Optionally, the authorization request includes: a hash value of the behavior data and a storage address of the behavior data; the generation module 302 is configured to generate the first verifiable claim based on the hash value, the storage address, the authorization information, the first digital identity information, and the second digital identity information, such that the supervision organization, when granted the access permission of the first verifiable claim, obtains the behavior data from a corresponding storage area based on the storage address included in the first verifiable claim in the blockchain, and backtracks the operational behavior of the first user corresponding to the service to be processed based on the obtained behavior data and the hash value included in the first verifiable claim.

Optionally, the generation module 302 is configured to obtain verification information to be verified of the first user, and determine that the authorization information satisfies the predetermined authorization condition if the verification information passes verification; or, the authorization request further includes first signature data, the first signature data being data obtained by signing specified data with a private key corresponding to the first digital identity information of the first user; the generation module 302 is configured to obtain a public key corresponding to the first digital identity information, verify the first signature data based on the obtained public key, and determine that the authorization information satisfies the predetermined authorization condition if the verification succeeds.

Optionally, the apparatus further includes: a digital identity processing module; the receiving module 301 is configured to, before receiving the authorization request sent by the service device, also receive an application request for digital identity information sent by the service device, where the application request includes user information of the first user; the digital identity processing module is configured to generate the first digital identity information of the first user based on the application request, associatively save the first digital identity information with the user information, and send the first digital identity information to the service device, such that the service device sends the first digital identity information to the client device.

Optionally, the behavior data includes one or more of video data, image data, and text data.

In the apparatus for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiment of the apparatus for backtracking a service behavior in the present specification and the embodiment of the method for backtracking a service behavior in the present specification are based on the same inventive concept, so the specific implementation of this embodiment can be referred to the previous implementation of the corresponding method for backtracking a service behavior. Details are omitted here for simplicity.

Figure 13:
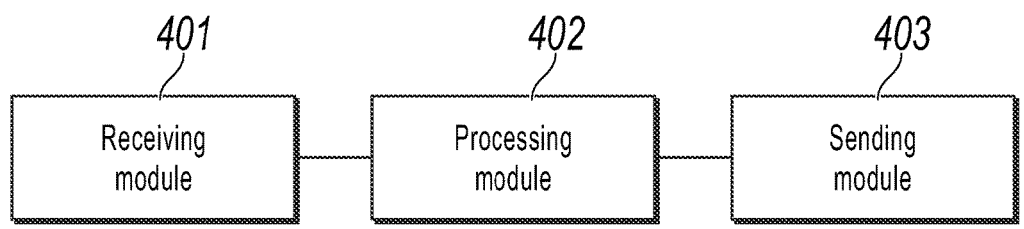
FIG. 13 is a schematic diagram illustrating a second module composition of an apparatus for backtracking a service behavior, according to one or more embodiments of the present specification.

Further, corresponding to the method for backtracking a service behavior previously described in FIGS. 10 and 11, based on the same technical concept, one or more embodiments of the present specification further provide another apparatus for backtracking a service behavior. FIG. 13 is a schematic diagram illustrating a module composition of another apparatus for backtracking a service behavior, according to one or more embodiments of the present specification. The apparatus is configured to execute the method for backtracking a service behavior described in FIGS. 10 and 11.

As shown in FIG. 13, the apparatus includes: a receiving module 401, configured to receive a service processing request sent by a client device, where the service processing request includes behavior data of an operational behavior of a first user in the client device corresponding to a service to be processed; a processing module 402, configured to perform corresponding service processing based on the service processing request, and obtain authorization information on an operation permission for the behavior data granted by the first user to the service device; and a sending module 403, configured to send an authorization request to an identity management system based on the authorization information, the behavior data, obtained first digital identity information of the first user, and second digital identity information of the service device, such that the identity management system saves a first verifiable claim generated based on the behavior data, the authorization information, the first digital identity information, and the second digital identity information to a blockchain, and a supervision organization, when granted an access permission of the first verifiable claim, backtracks the operational behavior of the first user corresponding to the service to be processed based on the first verifiable claim in the blockchain, where the first verifiable claim is used to prove that the service device is granted the operation permission.

In the apparatus for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Optionally, the apparatus further includes: a saving module; the saving module is configured to perform hash processing on the behavior data based on a predetermined algorithm to obtain a hash value of the behavior data, and save the behavior data to a designated storage area; the sending module 403 is configured to send the authorization request to the identity management system based on the authorization information, the hash value, a storage address of the behavior data, the first digital identity information, and the second digital identity information.

Optionally, the apparatus further includes: a determining module; the determining module is configured to determine first identification information of service data of the service to be processed after the receiving module 401 receives the service processing request sent by the client device; the sending module 403 is configured to send the authorization request to the identity management system based on the first identification information, the authorization information, the behavior data, the first digital identity information, and the second digital identity information, such that the identity management system generates the first verifiable claim based on the first identification information, the authorization information, the behavior data, the first digital identity information, and the second digital identity information; the receiving module 401 is configured to receive a query request sent by the supervision organization after the sending module 403 sends the authorization request to the identity management system based on the authorization information, the behavior data, the obtained first digital identity information of the first user, and the second digital identity information of the service device, where the query request includes third digital identity information of the supervision organization and first identification information associated with the behavior data to be queried; the sending module 403 is configured to send a permission sharing request to the identity management system based on the third digital identity information and the first identification information, such that the identity management system performs permission sharing processing to grant the supervision organization the access permission for the behavior data associated with the first identification information, and the supervision organization backtracks the operational behavior of the first user corresponding to the service to be processed based on the behavior data; the receiving module 401 is configured to receive permission sharing result information sent by the identity management system.

Optionally, the apparatus further includes: an acquisition module; the acquisition module is configured to obtain user information of the first user if it is determined that the service processing request does not include the first digital identity information of the first user; the sending module 403 is configured to send an application request for digital identity information to the identity management system based on the obtained identity information of the first user, such that the identity management system generates the first digital identity information of the first user, and associatively saves the first digital identity information with the user information; the receiving module 401 is configured to receive the first digital identity information sent by the identity management system, and send the first digital identity information to the client device.

Optionally, the behavior data includes one or more of video data, image data, and text data.

In the apparatus for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiment of the apparatus for backtracking a service behavior in the present specification and the embodiment of the method for backtracking a service behavior in the present specification are based on the same inventive concept, so the specific implementation of this embodiment can be referred to the previous implementation of the corresponding method for backtracking a service behavior, and details are omitted here for simplicity.

Figure 14:
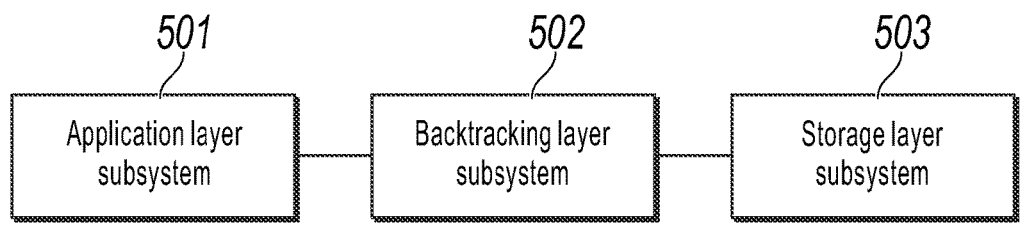
FIG. 14 is a schematic diagram illustrating a first composition of a system for backtracking a service behavior, according to one or more embodiments of the present specification.

Further, corresponding to the previous method for backtracking a service behavior, based on the same technical concept, one or more embodiments of the present specification further provide a system for backtracking a service behavior. FIG. 14 is a schematic diagram illustrating a composition of a system for backtracking a service behavior, according to one or more embodiments of the present specification. As shown in FIG. 14, the system includes: an application layer subsystem 501, a backtracking layer subsystem 502, and a storage layer subsystem. 503, where: the application layer subsystem 501 is configured to obtain behavior data of an operational behavior of a first user in the application layer subsystem corresponding to a service to be processed, and send a service processing request to the backtracking layer subsystem 502 based on the behavior data; the backtracking layer subsystem 502 is configured to perform corresponding service processing based on the service processing request, and obtain authorization information on an operation permission for the behavior data granted by the first user to the backtracking layer subsystem 502; if it is determined that the authorization information satisfies a predetermined authorization condition, generate a first verifiable claim based on the behavior data, the authorization information, first digital identity information of the first user, and second digital identity information of the backtracking layer subsystem 502; and send the first verifiable claim to the storage layer subsystem 503, where the first verifiable claim represents that the service device is granted the operation permission; the storage layer subsystem 503 is configured to store the first verifiable claim, such that a supervision organization, when granted an access permission of the first verifiable claim, backtracks the operational behavior of the first user corresponding to the service to be processed based on the first verifiable claim in the storage layer subsystem.

Optionally, the backtracking layer subsystem 502 is configured to generate first ciphertext data of the behavior data based on a predetermined encryption method, and generate the first verifiable claim based on first identification information of service data of the service to be processed included in the authorization request, the first ciphertext data, the authorization information, the first digital identity information, and the second digital identity information.

Optionally, the backtracking layer subsystem 502 includes a first permission processing module, and the first permission processing module is configured to receive a query request sent by the supervision organization, where the query request includes the first identification information associated with the behavior data to be queried; and perform permission sharing processing based on the query request to grant the supervision organization the access permission for the behavior data associated with the first identification information, such that the supervision organization backtracks the operational behavior of the first user corresponding to the service to be processed based on the behavior data.

Optionally, the system further includes an application extension management subsystem, and the application extension management subsystem distributes a plug-in to the application layer subsystem 501 such that the application layer subsystem 501 is installed with the plug-in to obtain the behavior data of the first user based on the plug-in. Specifically, the application layer subsystem 501 can send a plug-in acquisition request to the application extension management subsystem, and the application extension management subsystem distributes the plug-in to the application layer subsystem 501; and when the plug-in has a version update, the application extension management subsystem sends the plug-in of the latest version to the application layer subsystem 501.

Optionally, the storage layer subsystem 503 includes a blockchain; and the storage layer subsystem 503 can further include a cloud storage etc.

Optionally, the application layer subsystem includes a client device deployed in an end-user device of the first user, and the client device obtains the behavior data of the operational behavior of the first user in the client device corresponding to the service to be processed, and sends the service processing request to the backtracking layer subsystem based on the behavior data.

Optionally, the backtracking layer subsystem 502 includes a service device and an identity management system; the service device is configured to perform corresponding service processing based on the service processing request, obtain authorization information on an operation permission for the behavior data granted by the first user to the backtracking layer subsystem 502, and send the authorization request to the identity management system based on the authorization information, the behavior data, the first digital identity information, and the second digital identity information; the identity management system is configured to, if it is determined that the authorization information included in the authorization request satisfies a predetermined authorization condition, generate the first verifiable claim based on the behavior data, the authorization information, the first digital identity information, and the second digital identity information, and send the first verifiable claim to the storage layer subsystem 503.

It should be pointed out that the specific implementation processes of the operations executed by the previous subsystems can be referred to the relevant descriptions in the previous method embodiments. Details are omitted here for simplicity.

In the system for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when granted an operation permission for the behavior data by the user, the backtracking layer subsystem can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiments of the systems for backtracking a service behavior in the present specification and the embodiments of the methods for backtracking a service behavior in the present specification are based on the same inventive concept, so the specific implementation of this embodiment can be referred to the previous implementation of the corresponding method for backtracking a service behavior. Details are omitted here for simplicity.

Figure 15:
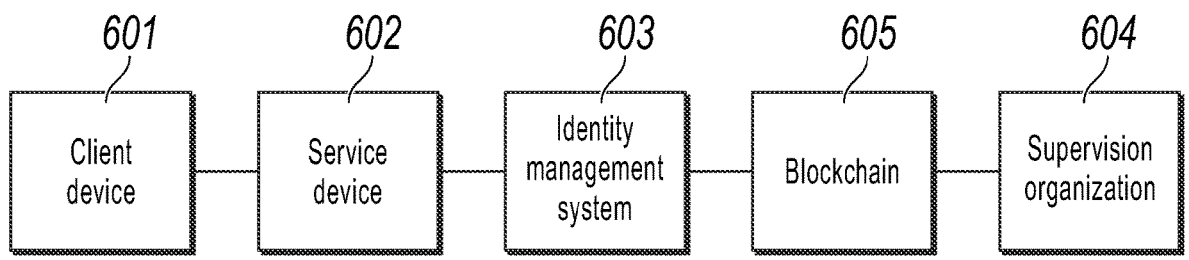
FIG. 15 is a schematic diagram illustrating a second composition of a system for backtracking a service behavior, according to one or more embodiments of the present specification.

Further, corresponding to the previous method for backtracking a service behavior, based on the same technical concept, one or more embodiments of the present specification further provide another system for backtracking a service behavior. FIG. 15 is a schematic diagram illustrating a composition of another system for backtracking a service behavior, according to one or more embodiments of the present specification. As shown in FIG. 15, the system includes: a client device 601, a service device 602, an identity management system 603, a supervision organization 604, and a blockchain 605; the client device 601 is configured to obtain behavior data of an operational behavior of a first user in the client device corresponding to a service to be processed, and send a service processing request to the service device 602 based on the behavior data; the service device 602 is configured to receive the service processing request sent by the client device 601, perform corresponding service processing based on the service processing request, obtain authorization information on an operation permission of the data granted by the first user to the service device, and send an authorization request to the identity management system 602 based on the authorization information, the behavior data, obtained first digital identity information of the first user, and second digital identity information of the service device 602; the identity management system 603 is configured to receive the authorization request sent by the service device 602, generate a first verifiable claim based on the behavior data, the authorization information, the first digital identity information, and the second digital identity information if it is determined that the authorization information satisfies a predetermined authorization condition, and save the first verifiable claim to the blockchain 605, where the first verifiable claim represents that the service device 602 is granted the operation permission; the supervision organization 604 is configured to, if determined to be granted an access permission of the first verifiable claim, backtrack the operational behavior of the first user corresponding to the service to be processed based on the first verifiable claim in the blockchain 605; and the blockchain 605 is configured to save the first verifiable claim.

Optionally, the supervision organization 604 is configured to send a query request to the service device 602; receive query acknowledgment information sent by the service device 602, and obtain associated second ciphertext data from the blockchain 605 based on third digital identity information of the supervision organization 604; and perform decryption based on the second ciphertext data and a private key corresponding to the third digital identity information to obtain the behavior data, where the second ciphertext data is generated by the identity management system 603 based on a permission sharing request sent by the service device 602, the first verifiable claim, and a public key corresponding to the third digital identity information, and the permission sharing request is sent based on the query request.

Optionally, the supervision organization 604 is configured to send a query request to the service device 602; and receive second ciphertext data sent by the identity management system 603, and perform decryption based on the second ciphertext data and a private key corresponding to the third digital identity information of the supervision organization 604 to obtain the behavior data, where the second ciphertext data is generated by the identity management system 603 based on a permission sharing request sent by the service device 602, the first verifiable claim, and a public key corresponding to the third digital identity information, and the permission sharing request is sent based on the query request.

Optionally, the supervision organization 604 is configured to send a message subscription request to the identity management system 603; the identity management system 603 is configured to perform message subscription processing based on the message subscription request, send message subscription success information to the supervision organization 604, and send push information to the supervision organization 604 if it is determined that the first verifiable claim is successfully saved to the blockchain 605; the supervision organization 604 is configured to receive the message subscription success information sent by the identity management system 603; and when receiving the push information sent by the identity management system 603, if it is determined that the supervision organization 604 is granted an access permission of the first verifiable claim, backtrack the operational behavior of the first user corresponding to the service to be processed based on the first verifiable claim in the blockchain 605.

In the system for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiment of the system for backtracking a service behavior in the present specification and the embodiment of the method for backtracking a service behavior in the present specification are based on the same inventive concept, so the specific implementation of this embodiment can be referred to the previous implementation of the corresponding method for backtracking a service behavior. Details are omitted here for simplicity.

Figure 16:
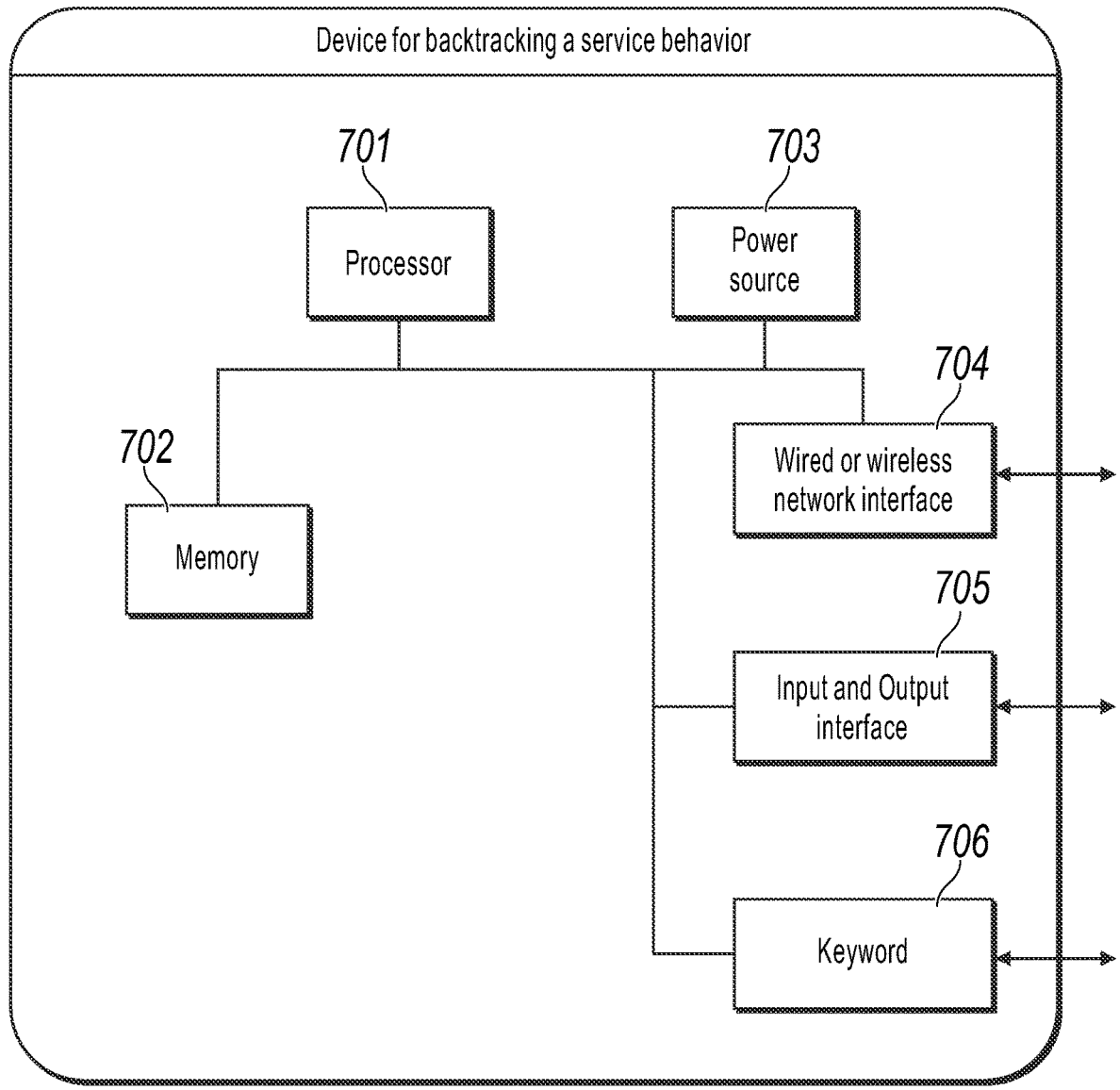
FIG. 16 is a schematic structural diagram illustrating a device for backtracking a service behavior, according to one or more embodiments of the present specification.

Further, corresponding to the previously described method for backtracking a service behavior, based on the same technical concept, one or more embodiments of the present specification further provide a device for backtracking a service behavior. The device is used to execute the previously described method for backtracking a service behavior. FIG. 16 is a schematic structural diagram illustrating a device for backtracking a service behavior, according to one or more embodiments of the present specification.

As shown in FIG. 16, the device for backtracking a service behavior can be of greater differences due to different configurations or performances, and can include one or more processors 701 and memories 702, and the memory 702 can store one or more storage applications or data. The memory 702 can be a transient storage or a persistent storage. The application stored in the memory 702 can include one or more modules (not shown in the figure), and each module can include a series of computer-executable instructions in the device for backtracking a service behavior. Furthermore, the processor 701 can be configured to communicate with the memory 702, and execute the series of computer-executable instructions in the memory 702 on the device for backtracking a service behavior. The device for backtracking a service behavior can further include one or more power sources 703, one or more wired or wireless network interfaces 704, one or more input and output interfaces 705, one or more keyboards 706, etc.

In a specific embodiment, the device for backtracking a service behavior includes a memory and one or more programs, where the one or more programs are stored in the memory, the one or more programs can include one or more modules, each module can include a series of computer-executable instructions in the device for backtracking a service behavior, and upon configuration, the one or more processors execute one or more plug-ins for performing the following computer-executable instructions.

An authorization request sent by a service device is received, where the authorization request is sent based on a service processing request sent by a client device, and the authorization request includes behavior data of an operational behavior of a first user in the client device corresponding to a service to be processed, authorization information on an operation permission for the behavior data granted by the first user to the service device, first digital identity information of the first user, and second digital identity information of the service device.

If it is determined that the authorization information satisfies a predetermined authorization condition, a first verifiable claim is generated based on the behavior data, the authorization information, the first digital identity information, and the second digital identity information, where the first verifiable claim represents that the service device is granted the operation permission.

The first verifiable claim is saved to a blockchain, such that a supervision organization, when granted an access permission of the first verifiable claim, backtracks the operational behavior of the first user corresponding to the service to be processed based on the first verifiable claim in the blockchain.

In the device for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Optionally, when the computer-executable instructions are executed, the authorization request further includes: first identification information of service data of the service to be processed; the step that a first verifiable claim is generated based on the behavior data, the authorization information, the first digital identity information, and the second digital identity information includes the following: first ciphertext data of the behavior data is generated based on a predetermined encryption method; and the first verifiable claim is generated based on the first identification information, the first ciphertext data, the authorization information, the first digital identity information, and the second digital identity information.

Optionally, when the computer-executable instructions are executed, after the first verifiable claim is saved to the blockchain, the method further includes the following: a permission sharing request sent by the service device is received, where the permission sharing request is sent based on a query request sent by the supervision organization, and the permission sharing request includes the first identification information associated with the behavior data to be queried; and permission sharing processing is performed based on the permission sharing request to grant the supervision organization the access permission for the behavior data associated with the first identification information, such that the supervision organization backtracks the operational behavior of the first user corresponding to the service to be processed based on the behavior data.

Optionally, when the computer-executable instructions are executed, the permission sharing request further includes: third digital identity information of the supervision organization; the step that the permission sharing processing is performed based on the permission sharing request includes: the associated first verifiable claim is obtained from the blockchain based on the first identification information; second ciphertext data is generated based on the obtained first verifiable claim and a public key corresponding to the third digital identity information; and the second ciphertext data and the third digital identity information are associatively saved to the blockchain, and permission sharing success information is sent to the service device, such that the service device sends query acknowledgment information to the supervision organization, and the supervision organization obtains the associated second ciphertext data from the blockchain based on the third digital identity information, and performs decryption based on the second ciphertext data and a private key corresponding to the third digital identity information to obtain the behavior data; or, the second ciphertext data is sent to the supervision organization such that the supervision organization performs decryption based on the second ciphertext data and a private key corresponding to the third digital identity information to obtain the behavior data, and permission sharing success information is sent to the service device.

Optionally, the step that when the computer-executable instructions are executed, first ciphertext data of the behavior data is generated based on a predetermined encryption method includes: the behavior data is encrypted based on a public key corresponding to the obtained second digital identity information to obtain the first ciphertext data; the step that second ciphertext data is generated based on the obtained first verifiable claim and a public key corresponding to the third digital identity information includes: the first ciphertext data in the first verifiable claim is decrypted based on a private key corresponding to the obtained second digital identity information to obtain the behavior data; and the obtained behavior data is encrypted based on the public key corresponding to the obtained third digital identity information to obtain the second ciphertext data.

Optionally, the step that when the computer-executable instructions are executed, first ciphertext data of the behavior data is generated based on a predetermined encryption method includes: a first key of the service device is determined; and the behavior data is encrypted based on the first key to obtain the first ciphertext data; the step that the first verifiable claim is saved to the blockchain includes: the first key is encrypted based on the public key corresponding to the obtained second digital identity information to obtain third ciphertext data; and the third ciphertext data and the first verifiable claim are associatively saved to the blockchain.

Optionally, the step that when the computer-executable instructions are executed, second ciphertext data is generated based on the obtained first verifiable claim and a public key corresponding to the third digital identity information includes: the third ciphertext data associatively saved with the first verifiable claim is obtained from the blockchain; the third ciphertext data is decrypted based on the private key corresponding to the obtained second digital identity information to obtain the first key; and the obtained first key is encrypted based on the public key corresponding to the obtained third digital identity information to obtain the second ciphertext data; the step that the second ciphertext data and the third digital identity information are associatively saved to the blockchain includes: the first identification information, the second ciphertext data, and the third digital identity information are associatively saved to the blockchain; the sending the second ciphertext data to the supervision organization includes: the first ciphertext data and the second ciphertext data are sent to the supervision organization.

Optionally, when the computer-executable instructions are executed, after the first verifiable claim is saved to the blockchain, the method further includes the following.

Permission sharing record information is generated based on the first identification information and the third digital identity information of the predetermined supervision organization, and the permission sharing record information is saved to the blockchain.

A query request sent by the supervision organization is received, where the query request includes the third digital identity information and the first identification information of the service data to be queried.

If it is determined that the associated permission sharing record information is identified from the blockchain based on the third digital identity information and the first identification information in the query request, the associated first verifiable claim is obtained from the blockchain based on the first identification information.

The first ciphertext data in the obtained first verifiable claim is decrypted to obtain the behavior data, and the obtained behavior data is sent to the supervision organization.

Optionally, when the computer-executable instructions are executed, the method further includes the following: a message subscription request sent by the supervision organization is received; message subscription processing is performed based on the message subscription request, and message subscription success information is sent to the supervision organization; and if it is determined that the first verifiable claim is successfully saved to the blockchain, push information is sent to the supervision organization, such that the supervision organization, when granted the access permission of the first verifiable claim, backtracks the operational behavior of the first user corresponding to the service to be processed based on the first verifiable claim in the blockchain.

Optionally, when the computer-executable instructions are executed, the authorization request includes: a hash value of the behavior data and a storage address of the behavior data; the step that a first verifiable claim is generated based on the behavior data, the authorization information, the first digital identity information, and the second digital identity information includes the following. The first verifiable claim is generated based on the hash value, the storage address, the authorization information, the first digital identity information, and the second digital identity information, such that the supervision organization, when granted the access permission of the first verifiable claim, obtains the behavior data from a corresponding storage area based on the storage address included in the first verifiable claim in the blockchain, and backtracks the operational behavior of the first user corresponding to the service to be processed based on the obtained behavior data and the hash value included in the first verifiable claim.

Optionally, the step that when the computer-executable instructions are executed, it is determined that the authorization information satisfies a predetermined authorization condition includes: verification information to be verified of the first user is obtained, and it is determined that the authorization information satisfies the predetermined authorization condition if the verification information passes verification; or the authorization request further includes first signature data, the first signature data being data obtained by signing specified data with a private key corresponding to the first digital identity information of the first user; the step that it is determined that the authorization information satisfies a predetermined authorization condition includes: a public key corresponding to the first digital identity information is obtained; and the first signature data is verified based on the obtained public key, and it is determined that the authorization information satisfies the predetermined authorization condition if the verification succeeds.

Optionally, when the computer-executable instructions are executed, before the receiving an authorization request sent by the service device, the method further includes the following: an application request for digital identity information sent by the service device is received, where the application request includes user information of the first user; the first digital identity information of the first user is generated based on the application request; and the first digital identity information and the user information are associatively saved, and the first digital identity information is sent to the service device, such that the service device sends the first digital identity information to the client device.

Optionally, when the computer-executable instructions are executed, the behavior data includes one or more of video data, image data, and text data.

In the device for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

In another specific embodiment, the device for backtracking a service behavior includes a memory and one or more programs, where the one or more programs are stored in the memory, the one or more programs can include one or more modules, each module can include a series of computer-executable instructions in the device for backtracking a service behavior, and upon configuration, the one or more processors execute one or more plug-ins for performing the following computer-executable instructions: a service processing request sent by a client device is received, where the service processing request includes behavior data of an operational behavior of a first user in the client device corresponding to a service to be processed; corresponding service processing is performed based on the service processing request, and authorization information on an operation permission for the behavior data granted by the first user to the service device is obtained; and an authorization request is sent to an identity management system based on the authorization information, the behavior data, obtained first digital identity information of the first user, and second digital identity information of the service device, such that the identity management system saves a first verifiable claim generated based on the behavior data, the authorization information, the first digital identity information, and the second digital identity information to a blockchain, and a supervision organization, when granted an access permission of the first verifiable claim, backtracks the operational behavior of the first user corresponding to the service to be processed based on the first verifiable claim in the blockchain, where the first verifiable claim is used to prove that the service device is granted the operation permission.

In the device for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Optionally, when the computer-executable instructions are executed, after the receiving a service processing request sent by a client device, the method further includes the following.

Hash processing is performed on the behavior data based on a predetermined algorithm to obtain a hash value of the behavior data; and the behavior data is saved to a designated storage area; where the sending an authorization request to an identity management system based on the authorization information, the behavior data, obtained first digital identity information of the first user, and second digital identity information of the service device includes: the authorization request is sent to the identity management system based on the authorization information, the hash value, a storage address of the behavior data, the first digital identity information, and the second digital identity information.

Optionally, when the computer-executable instructions are executed, after the receiving a service processing request sent by a client device, the method further includes the following: first identification information of service data of the service to be processed is determined; where the sending an authorization request to an identity management system based on the authorization information, the behavior data, obtained first digital identity information of the first user, and second digital identity information of the service device includes: the authorization request is sent to the identity management system based on the first identification information, the authorization information, the behavior data, the first digital identity information, and the second digital identity information, such that the identity management system generates the first verifiable claim based on the first identification information, the authorization information, the behavior data, the first digital identity information, and the second digital identity information; after the sending an authorization request to an identity management system based on the authorization information and the behavior data, the method further includes the following: a query request sent by the supervision organization is received, where the query request includes third digital identity information of the supervision organization and the first identification information associated with the behavior data to be queried; a permission sharing request is sent to the identity management system based on the third digital identity information and the first identification information, such that the identity management system performs permission sharing processing to grant the supervision organization the access permission for the behavior data associated with the first identification information, and the supervision organization backtracks the operational behavior of the first user corresponding to the service to be processed based on the behavior data; and permission sharing result information sent by the identity management system is received.

Optionally, when the computer-executable instructions are executed, before the sending an authorization request to an identity management system based on the authorization information, the behavior data, obtained first digital identity information of the first user, and second digital identity information of the service device, the method further includes the following: if it is determined that the service processing request does not include the first digital identity information of the first user, user information of the first user is obtained; an application request for digital identity information is sent to the identity management system based on the obtained identity information of the first user, such that the identity management system generates the first digital identity information of the first user, and associatively saves the first digital identity information with the user information; and the first digital identity information sent by the identity management system is received, and the first digital identity information is sent to the client device.

Optionally, when the computer-executable instructions are executed, the behavior data includes one or more of video data, image data, and text data.

In the device for backtracking a service behavior according to one or more embodiments of the present specification, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiment of the device for backtracking a service behavior in the present specification and the embodiment of the method for backtracking a service behavior in the present specification are based on the same inventive concept, so the specific implementation of this embodiment can be referred to the previous implementation of the corresponding method for backtracking a service behavior. Details are omitted here for simplicity.

Further, corresponding to the previously described method for backtracking a service behavior, based on the same technical concept, one or more embodiments of the present specification further provide a storage medium for storing computer-executable instructions. In a specific embodiment, the storage medium can be a U disk, an optical disk, a hard disk, etc. When the computer-executable instructions stored in the storage medium are executed by a processor, the following process can be implemented: an authorization request sent by a service device is received, where the authorization request is sent based on a service processing request sent by a client device, and the authorization request includes behavior data of an operational behavior of a first user in the client device corresponding to a service to be processed, authorization information on an operation permission for the behavior data granted by the first user to the service device, first digital identity information of the first user, and second digital identity information of the service device; if it is determined that the authorization information satisfies a predetermined authorization condition, a first verifiable claim is generated based on the behavior data, the authorization information, the first digital identity information, and the second digital identity information, where the first verifiable claim represents that the service device is granted the operation permission; and the first verifiable claim is saved to a blockchain, such that a supervision organization, when granted an access permission of the first verifiable claim, backtracks the operational behavior of the first user corresponding to the service to be processed based on the first verifiable claim in the blockchain.

When the computer-executable instructions stored in the storage medium according to one or more embodiments of the present specification are executed by a processor, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

Optionally, when the computer-executable instructions stored in the storage medium are executed by the processor, the authorization request further includes: first identification information of service data of the service to be processed; the step that a first verifiable claim is generated based on the behavior data, the authorization information, the first digital identity information, and the second digital identity information includes the following: first ciphertext data of the behavior data is generated based on a predetermined encryption method; and the first verifiable claim is generated based on the first identification information, the first ciphertext data, the authorization information, the first digital identity information, and the second digital identity information.

Optionally, when the computer-executable instructions stored in the storage medium are executed by the processor, after the saving the first verifiable claim to the blockchain, the method further includes the following: a permission sharing request sent by the service device is received, where the permission sharing request is sent based on a query request sent by the supervision organization, and the permission sharing request includes the first identification information associated with the behavior data to be queried; and permission sharing processing is performed based on the permission sharing request to grant the supervision organization the access permission for the behavior data associated with the first identification information, such that the supervision organization backtracks the operational behavior of the first user corresponding to the service to be processed based on the behavior data.

Optionally, when the computer-executable instructions stored in the storage medium are executed by the processor, the permission sharing request further includes: third digital identity information of the supervision organization; the step that the permission sharing processing is performed based on the permission sharing request includes: the associated first verifiable claim is obtained from the blockchain based on the first identification information; second ciphertext data is generated based on the obtained first verifiable claim and a public key corresponding to the third digital identity information; and the second ciphertext data and the third digital identity information are associatively saved to the blockchain, and permission sharing success information is sent to the service device, such that the service device sends query acknowledgment information to the supervision organization, and the supervision organization obtains the associated second ciphertext data from the blockchain based on the third digital identity information, and performs decryption based on the second ciphertext data and a private key corresponding to the third digital identity information to obtain the behavior data; or, the second ciphertext data is sent to the supervision organization such that the supervision organization performs decryption based on the second ciphertext data and a private key corresponding to the third digital identity information to obtain the behavior data, and permission sharing success information is sent to the service device.

Optionally, when the computer-executable instructions stored in the storage medium are executed by the processor, the step that first ciphertext data of the behavior data is generated based on a predetermined encryption method includes: the behavior data is encrypted based on a public key corresponding to the obtained second digital identity information to obtain the first ciphertext data; the step that second ciphertext data is generated based on the obtained first verifiable claim and a public key corresponding to the third digital identity information includes: the first ciphertext data in the first verifiable claim is decrypted based on a private key corresponding to the obtained second digital identity information to obtain the behavior data; and the obtained behavior data is encrypted based on the public key corresponding to the obtained third digital identity information to obtain the second ciphertext data.

Optionally, when the computer-executable instructions stored in the storage medium are executed by the processor, the step that first ciphertext data of the behavior data is generated based on a predetermined encryption method includes: a first key of the service device is determined; and the behavior data is encrypted based on the first key to obtain the first ciphertext data; the step that the first verifiable claim is saved to the blockchain includes: the first key is encrypted based on the public key corresponding to the obtained second digital identity information to obtain third ciphertext data; and the third ciphertext data and the first verifiable claim are associatively saved to the blockchain.

Optionally, the step that when the computer-executable instructions stored in the storage medium are executed by the processor, second ciphertext data is generated based on the obtained first verifiable claim and a public key corresponding to the third digital identity information includes: the third ciphertext data associatively saved with the first verifiable claim is obtained from the blockchain; the third ciphertext data is decrypted based on the private key corresponding to the obtained second digital identity information to obtain the first key; and the obtained first key is encrypted based on the public key corresponding to the obtained third digital identity information to obtain the second ciphertext data; the step that the second ciphertext data and the third digital identity information are associatively saved to the blockchain includes: the first identification information, the second ciphertext data, and the third digital identity information are associatively saved to the blockchain; the step that the second ciphertext data is sent to the supervision organization includes: the first ciphertext data and the second ciphertext data are sent to the supervision organization.

Optionally, when the computer-executable instructions stored in the storage medium are executed by the processor, after the saving the first verifiable claim to the blockchain, the method further includes the following: permission sharing record information is generated based on the first identification information and the third digital identity information of the predetermined supervision organization, and the permission sharing record information is saved to the blockchain; a query request sent by the supervision organization is received, where the query request includes the third digital identity information and the first identification information of the service data to be queried; if it is determined that the associated permission sharing record information is identified from the blockchain based on the third digital identity information and the first identification information in the query request, the associated first verifiable claim is obtained from the blockchain based on the first identification information; and the first ciphertext data in the obtained first verifiable claim is decrypted to obtain the behavior data, and the obtained behavior data is sent to the supervision organization.

Optionally, when the computer-executable instructions stored in the storage medium are executed by the processor, the method further includes the following: a message subscription request sent by the supervision organization is received; message subscription processing is performed based on the message subscription request, and message subscription success information is sent to the supervision organization; and if it is determined that the first verifiable claim is successfully saved to the blockchain, push information is sent to the supervision organization, such that the supervision organization, when granted the access permission of the first verifiable claim, backtracks the operational behavior of the first user corresponding to the service to be processed based on the first verifiable claim in the blockchain.

Optionally, when the computer-executable instructions stored in the storage medium are executed by the processor, the authorization request includes: a hash value of the behavior data and a storage address of the behavior data; the step that a first verifiable claim is generated based on the behavior data, the authorization information, the first digital identity information, and the second digital identity information includes the following: the first verifiable claim is generated based on the hash value, the storage address, the authorization information, the first digital identity information, and the second digital identity information, such that the supervision organization, when granted the access permission of the first verifiable claim, obtains the behavior data from a corresponding storage area based on the storage address included in the first verifiable claim in the blockchain, and backtracks the operational behavior of the first user corresponding to the service to be processed based on the obtained behavior data and the hash value included in the first verifiable claim.

Optionally, when the computer-executable instructions stored in the storage medium are executed by the processor, the step that it is determined that the authorization information satisfies a predetermined authorization condition includes: verification information to be verified of the first user is obtained, and it is determined that the authorization information satisfies the predetermined authorization condition if the verification information passes verification; or the authorization request further includes first signature data, the first signature data being data obtained by signing specified data with a private key corresponding to the first digital identity information of the first user; the step that it is determined that the authorization information satisfies a predetermined authorization condition includes: a public key corresponding to the first digital identity information is obtained; and the first signature data is verified based on the obtained public key, and it is determined that the authorization information satisfies the predetermined authorization condition if the verification succeeds.

Optionally, when the computer-executable instructions stored in the storage medium are executed by the processor, before the receiving an authorization request sent by the service device, the method further includes the following: an application request for digital identity information sent by the service device is received, where the application request includes user information of the first user; the first digital identity information of the first user is generated based on the application request; and the first digital identity information and the user information are associatively saved, and the first digital identity information is sent to the service device, such that the service device sends the first digital identity information to the client device.

Optionally, when the computer-executable instructions stored in the storage medium are executed by the processor, the behavior data includes one or more of video data, image data, and text data.

When the computer-executable instructions stored in the storage medium according to one or more embodiments of the present specification are executed by a processor, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

In another specific embodiment, the storage medium can be a U disk, an optical disk, a hard disk, etc. When the computer-executable instructions stored in the storage medium are executed by a processor, the following process can be implemented: a service processing request sent by a client device is received, where the service processing request includes behavior data of an operational behavior of a first user in the client device corresponding to a service to be processed; corresponding service processing is performed based on the service processing request, and authorization information on an operation permission for the behavior data granted by the first user to the service device is obtained; and an authorization request is sent to an identity management system based on the authorization information, the behavior data, obtained first digital identity information of the first user, and second digital identity information of the service device, such that the identity management system saves a first verifiable claim generated based on the behavior data, the authorization information, the first digital identity information, and the second digital identity information to a blockchain, and a supervision organization, when granted an access permission of the first verifiable claim, backtracks the operational behavior of the first user corresponding to the service to be processed based on the first verifiable claim in the blockchain, where the first verifiable claim is used to prove that the service device is granted the operation permission.

Optionally, when the computer-executable instructions stored in the storage medium are executed by the processor, after the receiving a service processing request sent by a client device, the method further includes the following.

Hash processing is performed on the behavior data based on a predetermined algorithm to obtain a hash value of the behavior data; and the behavior data is saved to a designated storage area; the sending an authorization request to an identity management system based on the authorization information, the behavior data, obtained first digital identity information of the first user, and second digital identity information of the service device includes: the authorization request is sent to the identity management system based on the authorization information, the hash value, a storage address of the behavior data, the first digital identity information, and the second digital identity information.

Optionally, when the computer-executable instructions stored in the storage medium are executed by the processor, after the receiving a service processing request sent by a client device, the method further includes: first identification information of service data of the service to be processed is determined; where the sending an authorization request to an identity management system based on the authorization information, the behavior data, obtained first digital identity information of the first user, and second digital identity information of the service device includes: the authorization request is sent to the identity management system based on the first identification information, the authorization information, the behavior data, the first digital identity information, and the second digital identity information, such that the identity management system generates the first verifiable claim based on the first identification information, the authorization information, the behavior data, the first digital identity information, and the second digital identity information; after the sending an authorization request to an identity management system based on the authorization information and the behavior data, the method further includes the following: a query request sent by the supervision organization is received, where the query request includes third digital identity information of the supervision organization and the first identification information associated with the behavior data to be queried; a permission sharing request is sent to the identity management system based on the third digital identity information and the first identification information, such that the identity management system performs permission sharing processing to grant the supervision organization the access permission for the behavior data associated with the first identification information, and the supervision organization backtracks the operational behavior of the first user corresponding to the service to be processed based on the behavior data; and permission sharing result information sent by the identity management system is received.

Optionally, when the computer-executable instructions stored in the storage medium are executed by the processor, before the sending an authorization request to an identity management system based on the authorization information, the behavior data, obtained first digital identity information of the first user, and second digital identity information of the service device, the method further includes: if it is determined that the service processing request does not include the first digital identity information of the first user, user information of the first user is obtained; an application request for digital identity information is sent to the identity management system based on the obtained identity information of the first user, such that the identity management system generates the first digital identity information of the first user, and associatively saves the first digital identity information with the user information; and the first digital identity information sent by the identity management system is received, and the first digital identity information is sent to the client device.

Optionally, when the computer-executable instructions stored in the storage medium are executed by the processor, the behavior data includes one or more of video data, image data, and text data.

When the computer-executable instructions stored in the storage medium according to one or more embodiments of the present specification are executed by a processor, behavior data of an operational behavior of a user corresponding to a service to be processed is obtained, and a first verifiable claim generated based on the behavior data is saved to a blockchain, which ensures the tamper resistance and traceability of the behavior data, not only can restore user's operational behavior in the service processing process based on the behavior data in the blockchain to avoid shirking responsibilities when problems occur, but also can standardize the service processing process to achieve service supervision. Moreover, only when the service device is granted an operation permission for the behavior data by the user, the identity management system can associatively save user's behavior data, authorization information, and user's digital identity information to the blockchain, and share an access permission of the behavior data to the supervision organization, which not only ensures the validity of authorization, but also makes the user be the highest permission manager of its own behavior data and safeguards user's rights and interests.

It is worthwhile to note that the embodiments of the storage medium in the present specification and the embodiments of the method for backtracking a service behavior in the present specification are based on the same inventive concept, so the specific implementation of this embodiments can be referred to the previous implementation of the corresponding method for backtracking a service behavior. Details are omitted here for simplicity.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the embodiments of the present specification are implemented, a function of each unit can be implemented in one or more pieces of software and/or hardware.

A person skilled in the art should understand that one or more embodiments of the present application can be provided as a method, a system, or a computer program product. Therefore, the one or more embodiments of the present specification can use a form of hardware only embodiments, software only embodiments, or embodiments with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), input/output interfaces, network interfaces, and memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The one or more embodiments of the present specification can be described in common contexts of computer executable instructions executed by a computer, such as a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiments.

The previous description is merely embodiments of the present specification, and is not intended to limit the present specification. A person skilled in the art can make various modifications and changes to the present specification. Any modification, equivalent replacement, or improvement made without departing from the spirit and principle of the present specification shall fall within the scope of the claims of the present specification.

What is claimed is:

1. A computer-implemented method for backtracking user operation of services, comprising:

receiving an authorization request from a service device, wherein the authorization request is based on a service processing request from a client device, and the authorization request comprises: data corresponding to a user's operation related to a service on the client device, authorization information for accessing the data granted by the user to the service device, a first digital identity of the user, and a second digital identity of the service device;

in response to determining that the authorization information satisfies a predetermined condition, generating a claim based on first ciphertext of the data, the authorization information, the first digital identity, and the second digital identity, wherein the claim indicates that the data is accessible by the service device;

recording the claim to a blockchain;

receiving a permission sharing request comprising identification information of service data corresponding to the service and a third digital identity of a supervising user; and in response to determining that the supervising user has permission to access the claim, granting permission to the supervising user to backtrack the user's operation on the client device corresponding to the service based on the claim in the blockchain, comprising:

generating second ciphertext based on the claim and a public key corresponding to the third digital identity, wherein the claim is obtained from the blockchain based on the identification information;

associating and saving the second ciphertext and the third digital identity to the blockchain; and sending permission sharing success information to the service device, wherein the permission sharing success information is used by the service device to send query acknowledgment to the supervising user that allows the supervising user to obtain the second ciphertext from the blockchain based on the third digital identity, and perform decryption of the second ciphertext using a private key corresponding to the third digital identity to obtain the data.

2. The computer-implemented method according to claim 1, wherein the authorization request further comprises: the identification information of service data corresponding to the service, and wherein generating the claim based on the data, the authorization information, the first digital identity, and the second digital identity comprises:
generating the first ciphertext of the data based on a predetermined encryption method; and
generating the claim based on the identification information, the first ciphertext, the authorization information, the first digital identity, and the second digital identity.

3. The computer-implemented method according to claim 2,
wherein the permission sharing request is sent from the service device and based on a query from the supervising user
wherein granting permission to the supervising user to backtrack the user's operation related to the service on the client device to the data based on the claim in the blockchain comprises granting permission to the supervising user to backtrack the user's operation related to the service on the client device to the data based on the permission sharing request.

4. The computer-implemented method according to claim 3, wherein the permission sharing request further comprises: the third digital identity of the supervising user, and granting permission to the supervising user to backtrack the user's operation on the client device corresponding to the service based on the permission sharing request comprises:
obtaining the claim from the blockchain based on the identification information;
generating the second ciphertext based on the claim and the public key corresponding to the third digital identity; and
sending the second ciphertext to the supervising user, wherein the supervising user performs decryption based on the second ciphertext and the private key corresponding to the third digital identity to obtain the data; and sending permission sharing success information to the service device.

5. The computer-implemented method according to claim 3, wherein generating the first ciphertext of the data based on the predetermined encryption method comprises: encrypting the data based on the public key corresponding to the second digital identity to obtain the first ciphertext, and
wherein generating the second ciphertext based on the claim and the public key corresponding to the third digital identity comprises:
decrypting the first ciphertext in the claim based on the private key corresponding to the second digital identity to obtain the data; and
encrypting the data based on the public key corresponding to the third digital identity to obtain the second ciphertext.

6. The computer-implemented method according to claim 3, wherein generating the first ciphertext of the data based on the predetermined encryption method comprises:
determining a first key of the service device; and
encrypting the data based on the first key to obtain the first ciphertext, and
wherein recording the claim to the blockchain comprises:
encrypting the first key based on the public key corresponding to the second digital identity to obtain a third ciphertext; and
associating and saving the third ciphertext and the claim to the blockchain.

7. The computer-implemented method according to claim 6, wherein generating the second ciphertext based on the claim and the public key corresponding to the third digital identity comprises:
obtaining the third ciphertext from the blockchain;
decrypting the third ciphertext based on the private key corresponding to the second digital identity to obtain the first key; and
encrypting the first key based on the public key corresponding to the third digital identity to obtain the second ciphertext,
wherein associating and saving the second ciphertext and the third digital identity to the blockchain comprises:
associating and saving the identification information, the second ciphertext, and the third digital identity to the blockchain, and
wherein sending the second ciphertext to the supervising user comprises:
sending the first ciphertext and the second ciphertext to the supervising user.

8. The computer-implemented method according to claim 2, further comprising, after recording the claim to the blockchain:
generating permission sharing record based on the identification information and the third digital identity, and saving the permission sharing record to the blockchain;
receiving a query from the supervising user, wherein the query comprises the third digital identity and the identification information;
in response to determining that the permission sharing record is identified from the blockchain based on the third digital identity and the identification information in the query, obtaining the claim from the blockchain based on the identification information; and
decrypting the first ciphertext in the claim to obtain the data, and sending the data to the supervising user.

9. The computer-implemented method according to claim 1, further comprising:
receiving a message subscription request from the supervising user;
processing message subscription based on the message subscription request, and sending message subscription success information to the supervising user; and
in response to determining that the claim is successfully saved to the blockchain, sending push information to the supervising user, granting permission to the supervising user to access the claim, and allowing the supervising user to backtrack the user's operation related to the service on the client device based on the claim in the blockchain.

10. The computer-implemented method according to claim 1, wherein the authorization request comprises a hash value of the data and a storage address of the data,
wherein generating the claim based on the data, the authorization information, the first digital identity, and the second digital identity comprises:
generating the claim based on the hash value, the storage address, the authorization information, the first digital identity, and the second digital identity.

11. The computer-implemented method according to claim 1, wherein determining that the authorization information satisfies the predetermined condition comprises:
obtaining verification information to be verified of the user; and
determining that the authorization information satisfies the predetermined condition if the verification information passes verification.

12. The computer-implemented method according to claim 1, wherein the authorization request further comprises first signature data, the first signature data obtained by signing specified data with a private key corresponding to the first digital identity, and
wherein determining that the authorization information satisfies the predetermined condition comprises:
obtaining a public key corresponding to the first digital identity; and
verifying the first signature data based on the public key, and determining that the authorization information satisfies the predetermined condition if the verification succeeds.

13. The computer-implemented method according to claim 1, further comprising, before receiving the authorization request from the service device:
receiving an application request for digital identity information from the service device, wherein the application request comprises user information of the user;
generating the first digital identity based on the application request;
associating and saving the first digital identity and the user information; and
sending the first digital identity to the service device, such that the service device sends the first digital identity to the client device.

14. The computer-implemented method according to claim 1, wherein the data comprises one or more of video data, image data, and text data.

15. A computer-implemented system for backtracking user operation of services, comprising:
one or more computers; and
one or more computer memory devices interoperably coupled with the one or more computers and having tangible, non-transitory, machine-readable media storing one or more instructions that, when executed by the one or more computers, perform operations comprising:
receiving an authorization request from a service device, wherein the authorization request is based on a service processing request from a client device, and the authorization request comprises: data corresponding to a user's operation related to a service on the client device, authorization information for accessing the data granted by the user to the service device, a first digital identity of the user, and a second digital identity of the service device;
in response to determining that the authorization information satisfies a predetermined condition, generating a claim based on first ciphertext of the data, the authorization information, the first digital identity, and the second digital identity, wherein the claim indicates that the data is accessible by the service device;
recording the claim to a blockchain;
receiving a permission sharing request comprising identification information of service data corresponding to the service and a third digital identity of a supervising user; and
in response to determining that the supervising user has permission to access the claim, granting permission to the supervising user to backtrack the user's operation on the client device corresponding to the service based on the claim in the blockchain, comprising:
generating second ciphertext based on the claim and a public key corresponding to the third digital identity, wherein the claim is obtained from the blockchain based on the identification information;
associating and saving the second ciphertext and the third digital identity to the blockchain; and
sending permission sharing success information to the service device, wherein the permission sharing success information is used by the service device to send query acknowledgment to the supervising user that allows the supervising user to obtain the second ciphertext from the blockchain based on the third digital identity, and perform decryption of the second ciphertext using a private key corresponding to the third digital identity to obtain the data.

16. The computer-implemented system according to claim 15, wherein the authorization request further comprises: the identification information of service data corresponding to the service, and wherein generating the claim based on the data, the authorization information, the first digital identity, and the second digital identity comprises:
generating the first ciphertext of the data based on a predetermined encryption method; and
generating the claim based on the identification information, the first ciphertext, the authorization information, the first digital identity, and the second digital identity.

17. The computer-implemented system according to claim 16,
wherein the permission sharing request is sent from the service device and based on a query from the supervising user
wherein granting permission to the supervising user to backtrack the user's operation related to the service on the client device to the data based on the claim in the blockchain comprises granting permission to the supervising user to backtrack the user's operation related to the service on the client device to the data based on the permission sharing request.

18. A non-transitory, computer-readable medium storing one or more instructions executable by a computer system to perform operations for backtracking user operation of services, comprising:
receiving an authorization request from a service device, wherein the authorization request is based on a service processing request from a client device, and the authorization request comprises: data corresponding to a user's operation related to a service on the client device, authorization information for accessing the data granted by the user to the service device, a first digital identity of the user, and a second digital identity of the service device;
in response to determining that the authorization information satisfies a predetermined condition, generating a claim based on first ciphertext of the data, the authorization information, the first digital identity, and the second digital identity, wherein the claim indicates that the data is accessible by the service device;
recording the claim to a blockchain;

receiving a permission sharing request comprising identification information of service data corresponding to the service and a third digital identity of a supervising user; and in response to determining that the supervising user has permission to access the claim, granting permission to the supervising user to backtrack the user's operation on the client device corresponding to the service based on the claim in the blockchain, comprising:

generating second ciphertext based on the claim and a public key corresponding to the third digital identity, wherein the claim is obtained from the blockchain based on the identification information;

associating and saving the second ciphertext and the third digital identity to the blockchain; and sending permission sharing success information to the service device, wherein the permission sharing success information is used by the service device to send query acknowledgment to the supervising user that allows the supervising user to obtain the second ciphertext from the blockchain based on the third digital identity, and perform decryption of the second ciphertext using a private key corresponding to the third digital identity to obtain the data.

* * * * *